(12) United States Patent
DeWitte et al.

(10) Patent No.: US 12,347,576 B2
(45) Date of Patent: Jul. 1, 2025

(54) FUEL CELL LIFTING SYSTEM FOR NUCLEAR REACTORS

(71) Applicant: OKLO INC., Sunnyvale, CA (US)

(72) Inventors: Jacob DeWitte, Mountain View, CA (US); Caroline Cochran, Mountain View, CA (US); Patrick Everett, San Francisco, CA (US); John Hanson, Sunnyvale, CA (US); Joshua G. Richard, Sunnyvale, CA (US); Alex Renner, Silverthorne, CO (US); Nathan Graff, Sunnyvale, CA (US); David Hawn, Houston, TX (US)

(73) Assignee: Oklo Inc., Santa Clara, CA (US)

( * ) Notice: Subject to any disclaimer, the term of this patent is extended or adjusted under 35 U.S.C. 154(b) by 0 days.

(21) Appl. No.: 18/340,459

(22) Filed: Jun. 23, 2023

(65) Prior Publication Data
US 2023/0420149 A1    Dec. 28, 2023

Related U.S. Application Data

(63) Continuation of application No. 17/601,886, filed as application No. PCT/US2021/021349 on Mar. 8, 2021, now Pat. No. 11,735,326.
(Continued)

(51) Int. Cl.
*G21C 19/10*  (2006.01)
*G21C 11/02*  (2006.01)
(Continued)

(52) U.S. Cl.
CPC .............. *G21C 19/10* (2013.01); *G21C 11/02* (2013.01); *G21C 19/06* (2013.01); *G21C 19/02* (2013.01); *G21C 19/105* (2013.01); *G21F 5/065* (2013.01)

(58) Field of Classification Search
CPC ........ G21C 19/10; G21C 19/06; G21C 11/02; G21C 19/105; G21C 19/02; G21D 1/003; G21F 5/02; G21F 5/065
(Continued)

(56) References Cited

U.S. PATENT DOCUMENTS

| 3,302,042 A | 1/1967 | Grover et al. |
| 3,378,449 A | 4/1968 | Croke et al. |

(Continued)

OTHER PUBLICATIONS

International Search Report and Written Opinion in related International Application No. PCT/US2021/021349, dated Sep. 6, 2021, 18 pages.
(Continued)

*Primary Examiner* — Peter M Poon
*Assistant Examiner* — Daniel Wasil
(74) *Attorney, Agent, or Firm* — Fish & Richardson P.C.

(57) ABSTRACT

Fuel cell lifting systems for nuclear reactors are disclosed. A fuel cell lifting system includes a radiation shield comprising: a first plate defining a first plane and comprising one or more first openings; and a second plate defining a second plane parallel to the first plane and comprising one or more second openings. At least one of the first plate or the second plate is rotatable around an axis perpendicular to the first plane and the second plane. A first opening of the first plate can be aligned with a second opening of the second plate to form a combined opening. A lifting motor is configured to extend and retract a tether through the combined opening of the radiation shield. The tether is attachable to a nuclear fuel cell.

15 Claims, 32 Drawing Sheets

Related U.S. Application Data

(60) Provisional application No. 62/985,963, filed on Mar. 6, 2020, provisional application No. 62/987,133, filed on Mar. 9, 2020.

(51) Int. Cl.
   *G21C 19/06* (2006.01)
   *G21C 19/02* (2006.01)
   *G21C 19/105* (2006.01)
   *G21F 5/06* (2006.01)

(58) Field of Classification Search
   USPC .................. 376/206, 264, 269, 271, 287
   See application file for complete search history.

(56) References Cited

U.S. PATENT DOCUMENTS

| | | | |
|---|---|---|---|
| 3,668,070 A | | 6/1972 | Fiebelmann et al. |
| 4,149,087 A | * | 4/1979 | Artemiev ............... G21F 5/065 |
| | | | 376/272 |
| 4,746,485 A | * | 5/1988 | Commander ........... G21C 19/10 |
| | | | 376/206 |
| 5,408,510 A | | 4/1995 | Ball et al. |
| 5,533,075 A | * | 7/1996 | Jones ..................... G21F 5/008 |
| | | | 376/272 |
| 8,666,016 B2 | * | 3/2014 | Arai ....................... G21C 19/10 |
| | | | 376/271 |
| 11,735,326 B2 | | 8/2023 | DeWitte et al. |
| 2009/0285349 A1 | | 11/2009 | Ahlfeld et al. |
| 2018/0226159 A1 | | 8/2018 | Sterbentz et al. |
| 2020/0027578 A1 | | 1/2020 | O'Brien |
| 2021/0335510 A1 | | 10/2021 | Loginov et al. |
| 2023/0154634 A1 | | 5/2023 | DeWitte et al. |

OTHER PUBLICATIONS

International Preliminary Report on Patentability in International Appln. No. PCT/US2021/021349, mailed on Sep. 15, 2022, 13 pages.

Office Action in Canadian Appln. No. 3171117, dated Oct. 25, 2023, 3 pages.

* cited by examiner

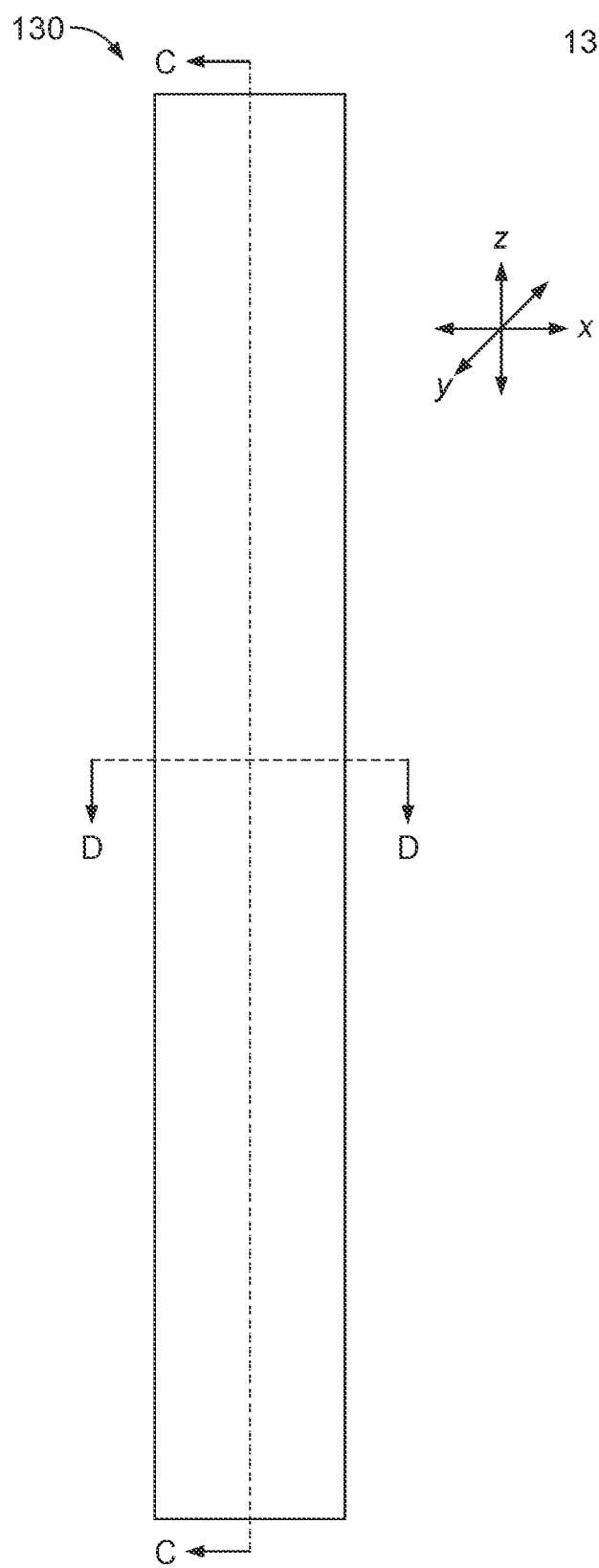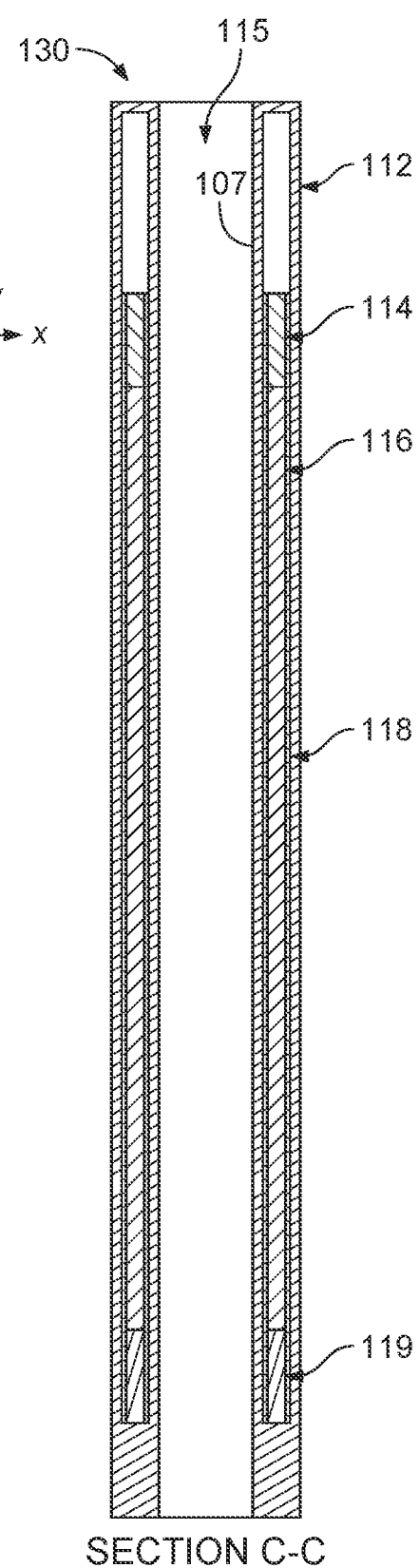
FIG. 3A
FIG. 3B

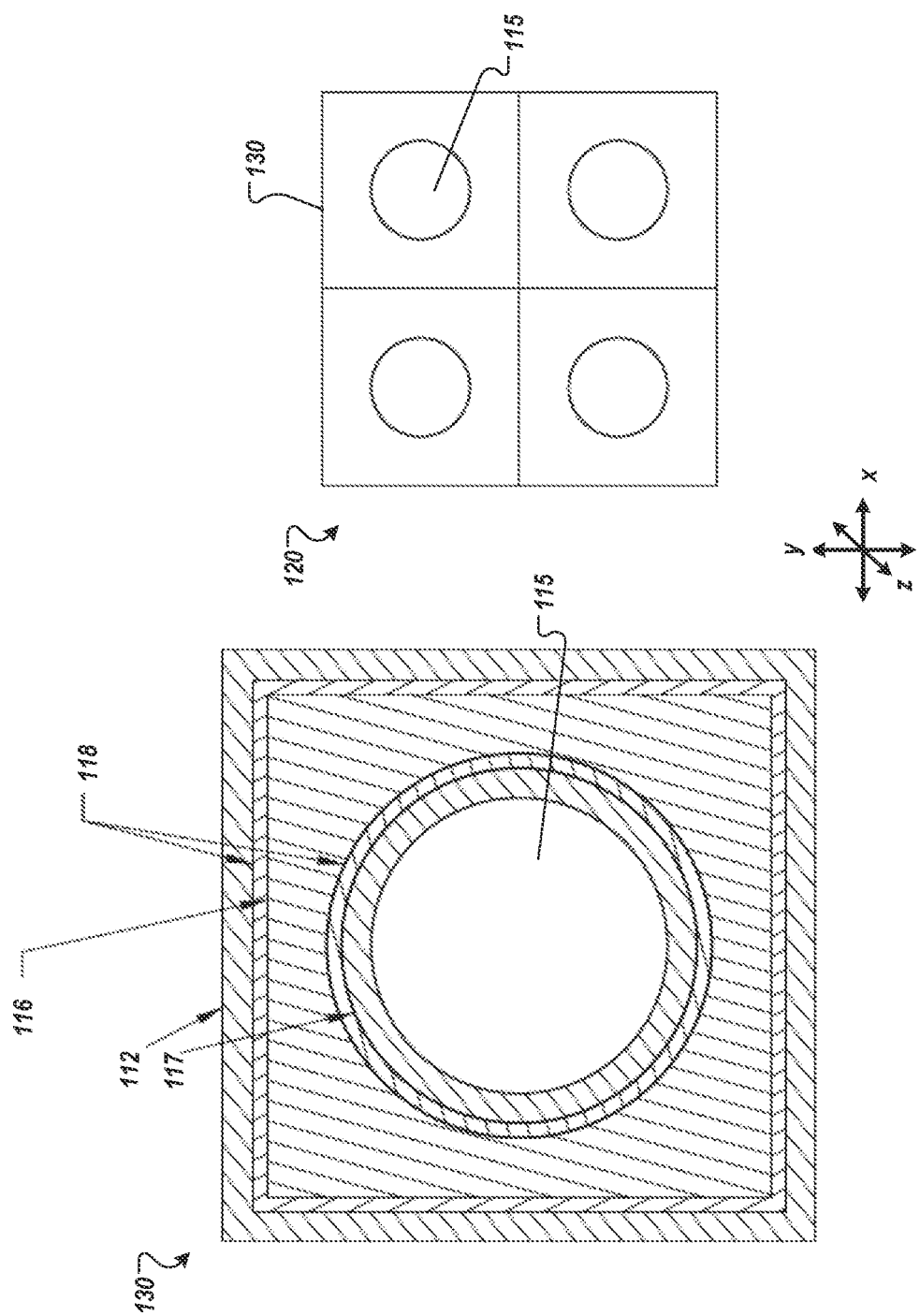

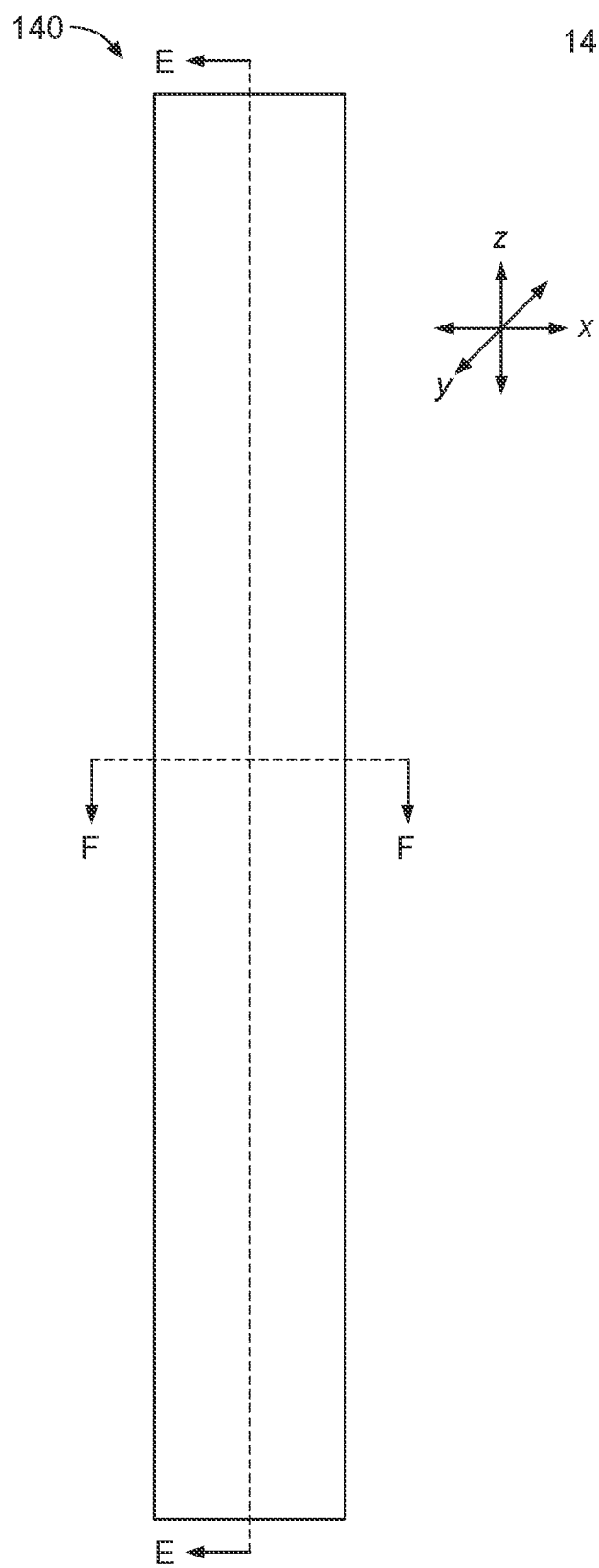
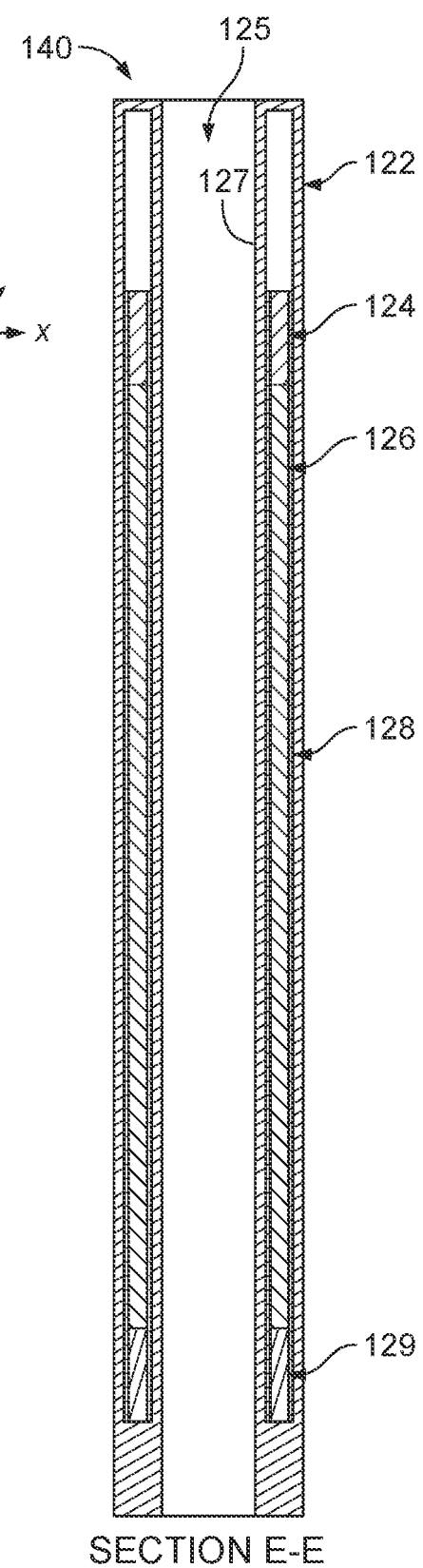
FIG. 5A
FIG. 5B

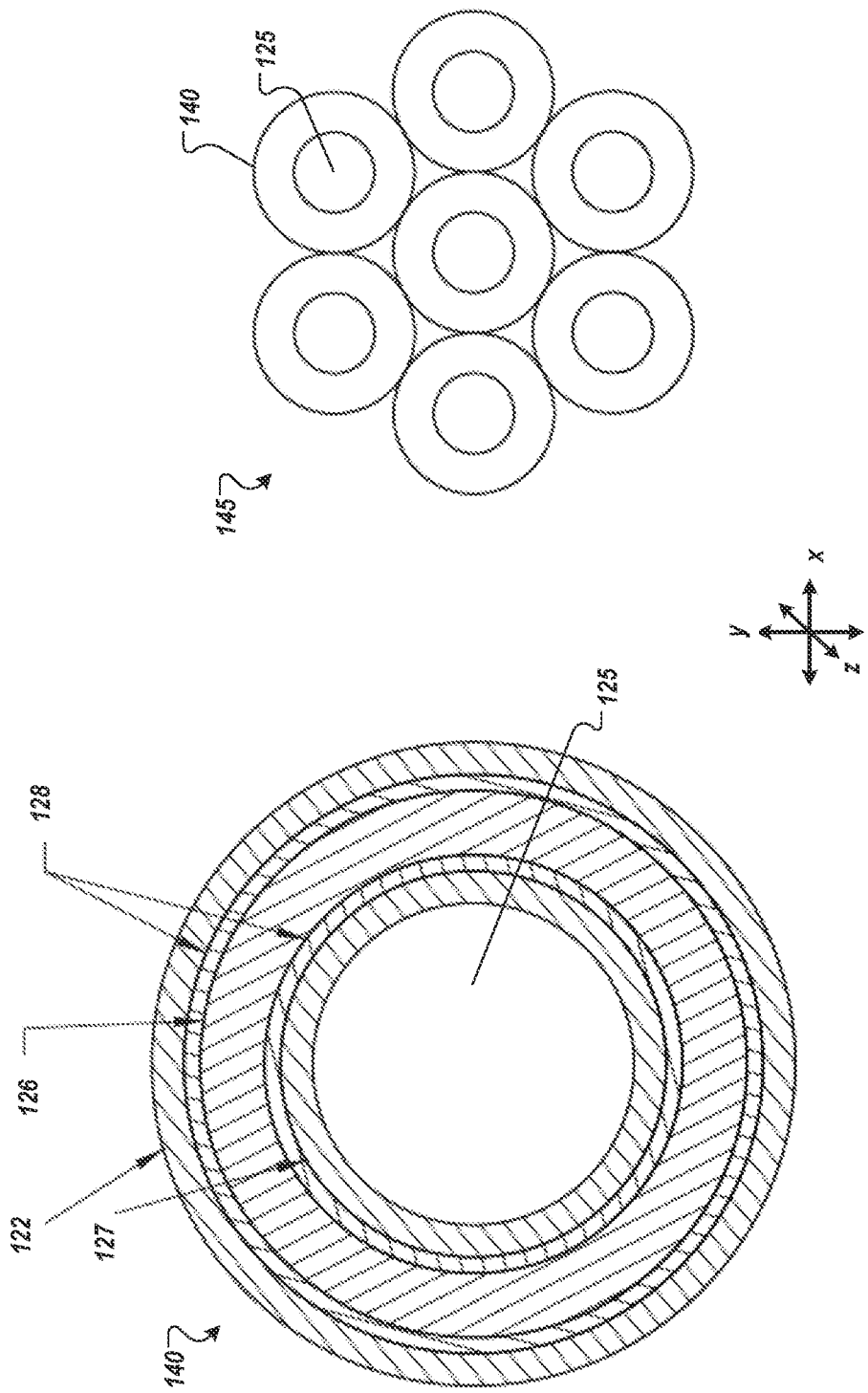

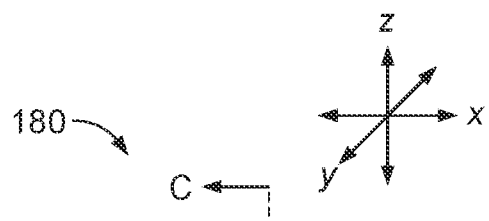
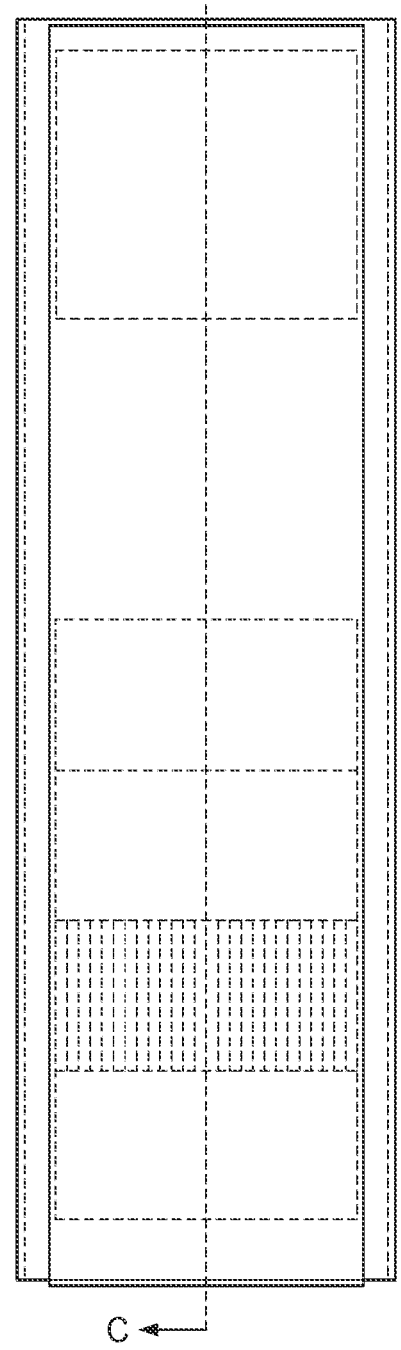
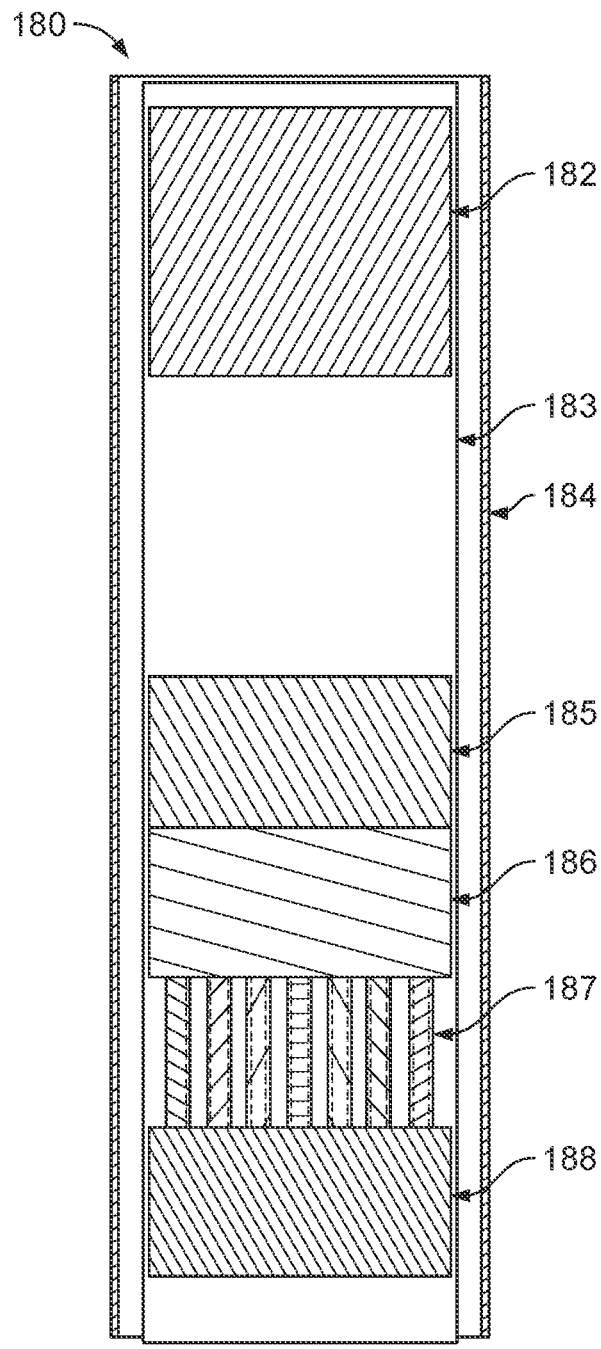
FIG. 8A  FIG. 8B

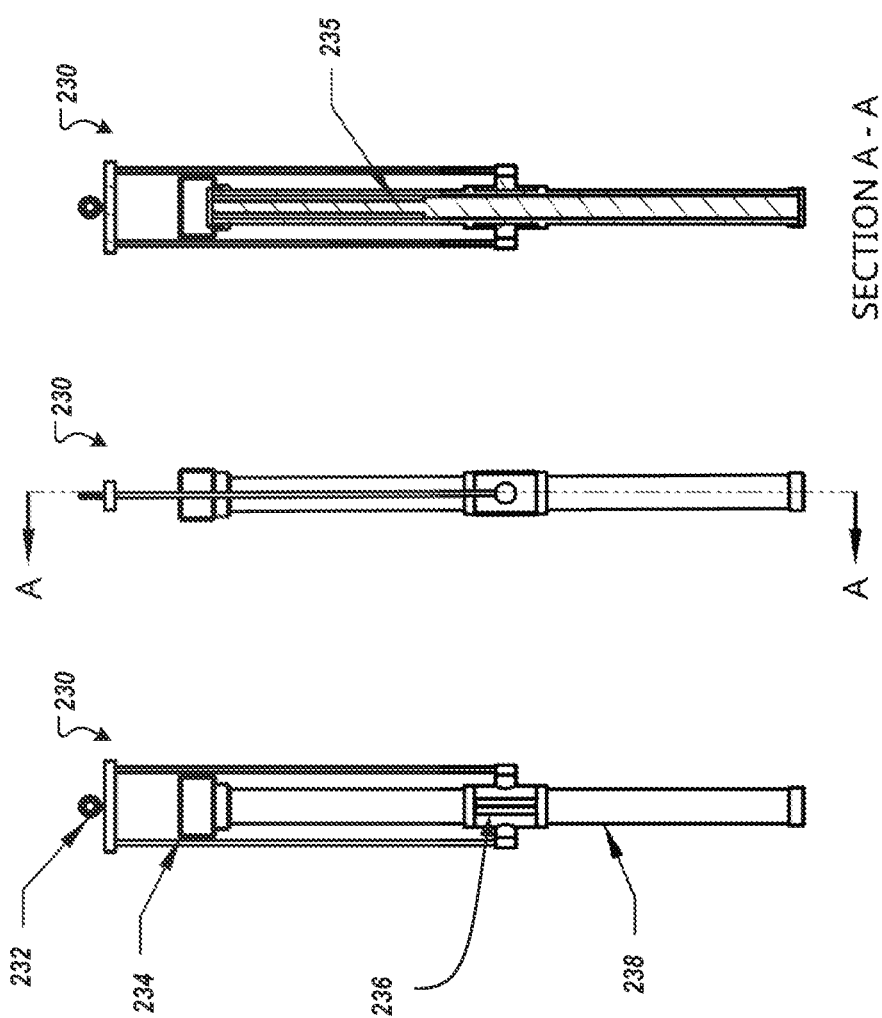

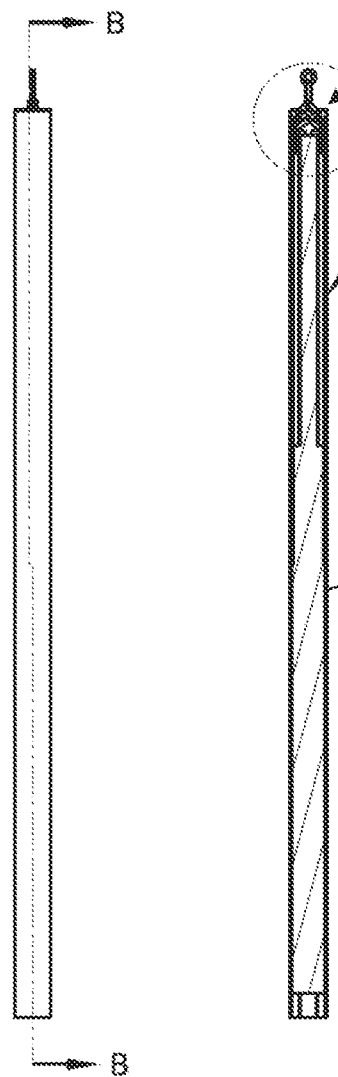
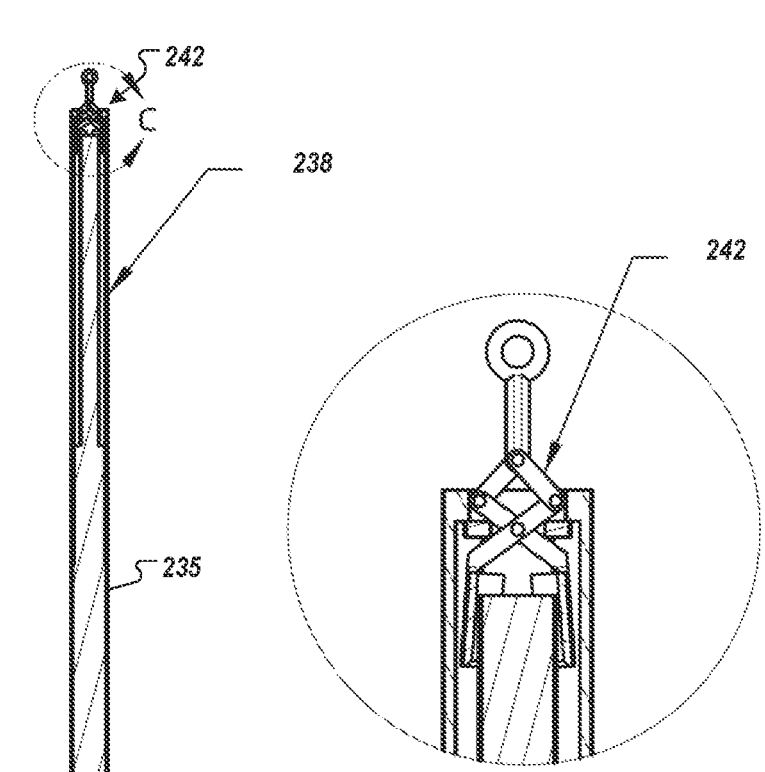
FIG. 14C
FIG. 14A   FIG. 14B

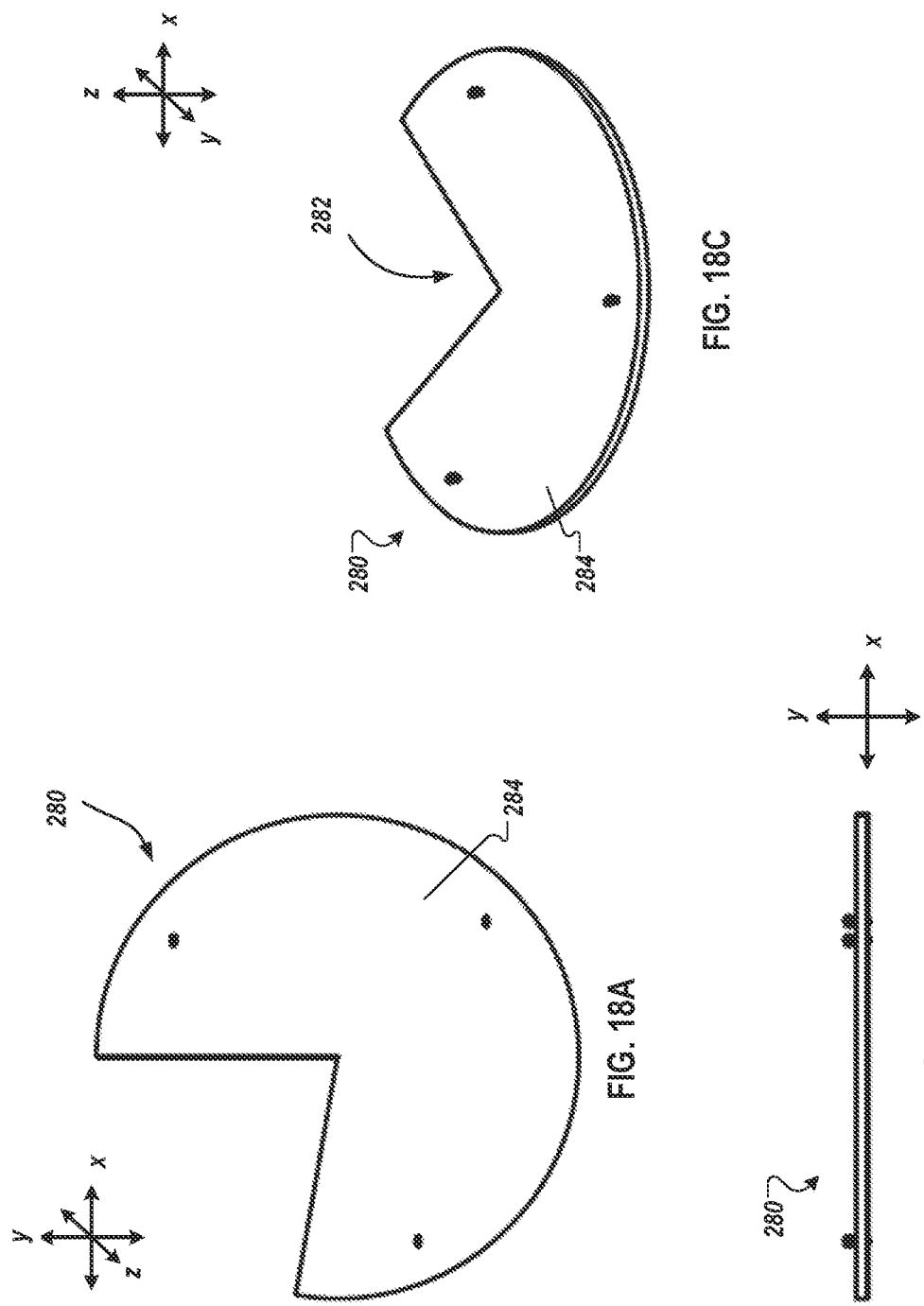

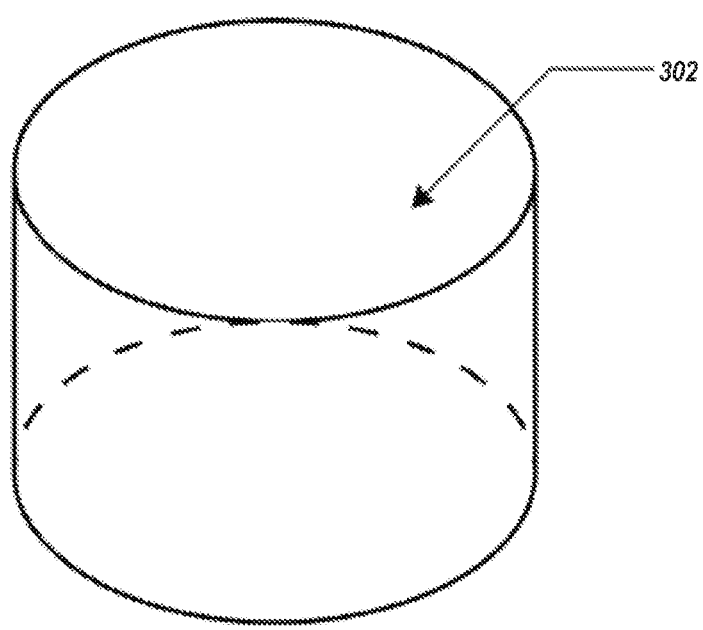
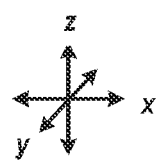
FIG. 20

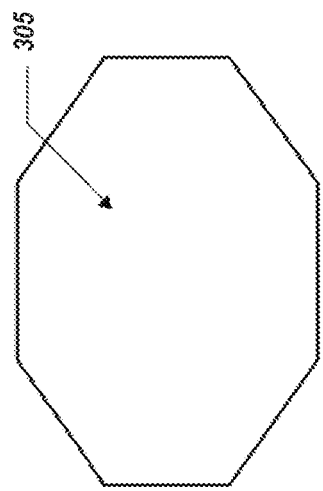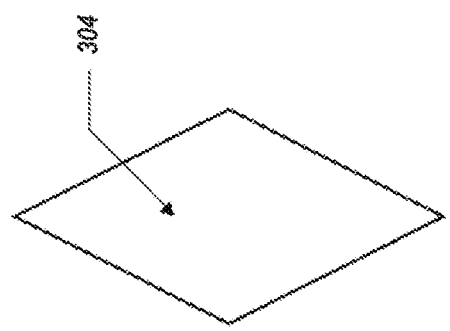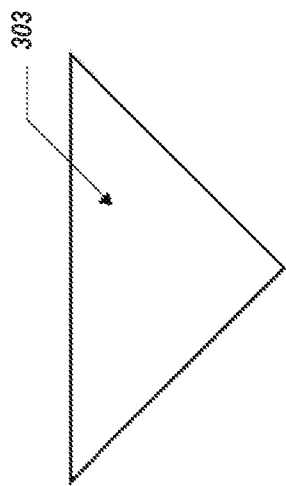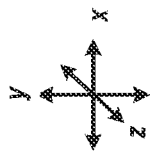
FIG. 21

FUEL CELL LIFTING SYSTEM FOR NUCLEAR REACTORS

CROSS-REFERENCE TO RELATED APPLICATIONS

This application is a continuation of U.S. application Ser. No. 17/601,886 filed Oct. 6, 2021 (now allowed), which is a U.S. National Stage Application under 35 U.S.C. § 371 and claims the benefit of International Application No. PCT/US2021/021349 filed Mar. 8, 2021, which claims the benefit of U.S. Provisional Patent Application Ser. No. 62/985,963 filed Mar. 6, 2020, and U.S. Provisional Patent Application Ser. No. 62/987,133 filed Mar. 9, 2020, each of which is incorporated herein by reference in its entirety.

TECHNICAL FIELD

The present invention relates generally to nuclear reactors. More specifically, the present disclosure relates to a method of forming nuclear fuel for use in a nuclear reactor, to a heat exchanger for removing heat from the nuclear fuel using heat pipes, and to reactors that use liquid or gas coolants.

BACKGROUND

Global energy growth and a drive to reduce pollution and emissions is stimulating new activity around the commercialization and design of new reactor technologies. Some of these technologies include small reactors designed to provide long lasting and resilient power in a more distributed fashion.

SUMMARY

This disclosure describes implementations of systems and methods for forming nuclear fuel for use in a nuclear reactor. A nuclear reactor system can include fuel with a fissile material such as Uranium-233, Uranium-235, or Plutonium-239.

Implementations of systems and method for forming nuclear fuel, such as through an electrical discharge machining (EDM) process, can include one or more of the following features. For example, the disclosed systems and methods can allow for a manufacturing process for metallic fuel, especially for advanced reactors, that can be scalable both down and up without significant investment in various tooling and infrastructure, like rapid prototyping. As another example, the disclosed systems and methods can provide a more materially uniform manufacturing product with reduced defects for atypical nuclear fuel element shapes, such as shapes that are different from cylindrical elements. Further, the disclosed systems and methods can remove cost and investment burden for retooling for different fuel shapes. Also, the disclosed systems and methods can reduce manufacturing error or defects common to manufacturing unusual fuel element shapes (such as those different from cylindrical elements). As another example, the disclosed systems and methods can reduce time and costs to manufacture unusual fuel element shapes. Further, the disclosed systems and methods can reduce wastage of stock fuel material compared with conventional manufacturing methods for nuclear fuel elements.

In certain disclosed implementations of an EDM process for manufacturing nuclear fuel (e.g., metallic nuclear fuel), such features can be achieved by machining metallic fuel elements out of a large cast ingot of fuel directly by using the EDM process. In some cases, the EDM process can be rapidly executed relative to conventional techniques by arranging a repeatable pattern to be cut out of an ingot of fuel stock. The EDM process, as described herein, can be used to form metallic fuel as well as ceramic fuel. The EDM process may not require bits prone to breakage on hard materials like metallic nuclear fuel. The EDM process can also eliminate (at least partially) chips and other debris from the nuclear fuel stock or, alternatively, can allow for easy collection of such debris so that wastage can be minimized. The EDM process can also shorten a time for manufacturing nuclear fuel through the use of the pre-located tooling positions based on a standard stock size of the fuel elements.

A nuclear reactor system can include a heat exchanger system to transport heat away from the fuel. Additional heat transfer systems and methods can be used to transfer heat from the heat pipe to a power conversion system, such as a turbine. The nuclear reactor system can additionally include instrumentation, supporting structures, and shielding.

The heat exchanger system includes one or more heat exchangers. Each heat exchanger can include a heat pipe that removes heat using alkali metals, halide salts, or other suitable working fluids. An outside surface of the heat pipe can be wrapped with a tube bundle, such that the tube bundle is in thermal communication with the heat pipe. Each tube bundle can include multiple tubes in a helical shape. The heat pipe removes heat from the nuclear reactor. The tube bundle removes heat from the heat pipe and can transfer the heat to a power conversion system.

In some implementations, the tube bundles can be mounted to an outer surface of a sheath. The sheath can be removably placed around the heat pipe. In some implementations, multiple tube bundles can be mounted together in a structural assembly. The structural assembly can be removably placed around one or more heat pipes. In some implementations, the heat exchangers can be arranged in an array with a lattice pattern. The lattice pattern can be, for example, a hexagonal lattice pattern or a rectangular (or square) lattice pattern. The tube bundles of the heat exchanger can be manufactured simply from light-weight materials. The tube bundle can include narrow tubes with thin tube walls that are able to withstand high pressures.

It can be advantageous to be able to remove the tube bundles for maintenance and repairs. Therefore, modularity and removability can be desirable in the heat exchanger system. The tube bundles of the heat exchanger can be easily installed on the heat pipes. The tube bundles can also be easily removed from the heat pipes. Sheath-mounted tube bundles, and assemblies of multiple tube bundles, can be modularly installed on, and removed from, heat pipes.

In an example implementation, a method includes positioning a stock of a nuclear fuel material into an electronic discharge machining (EDM) system; and operating the EDM system to form a nuclear fuel element from the stock.

An aspect combinable with the example implementation further includes operating the EDM system to form a plurality of nuclear fuel elements from the stock.

In another aspect combinable with any of the previous aspects, operating the EDM system to form the nuclear fuel elements includes cutting a particular perimeter shape of the nuclear fuel elements into the stock for each nuclear fuel element.

In another aspect combinable with any of the previous aspects, the particular perimeter shape includes a repeating pattern in the stock.

In another aspect combinable with any of the previous aspects, operating the EDM system to form the nuclear fuel elements includes continuously cutting the stock to repeatedly form the nuclear fuel elements in series.

In another aspect combinable with any of the previous aspects, continuously cutting the stock to repeatedly form the nuclear fuel elements in series includes making a single, uninterrupted cut in the stock to form the nuclear fuel elements.

In another aspect combinable with any of the previous aspects, the stock includes a metallic or ceramic fuel form that includes fissionable or fertile nuclear fuel materials.

In another aspect combinable with any of the previous aspects, the particular perimeter shape includes one of triangular, hexagonal, circular, diamond, or octagonal.

Another aspect combinable with any of the previous aspects further includes operating the EDM system to form a bore through the nuclear fuel element.

In another aspect combinable with any of the previous aspects, the bore is circular.

In another aspect combinable with any of the previous aspects, the stock includes at least one of uranium, thorium, or plutonium.

In another aspect combinable with any of the previous aspects, operating the EDM system to form a nuclear fuel element from the stock includes operating the EDM system to form one or more external surfaces of the nuclear fuel element; and operating the EDM system to form a bore through the nuclear fuel element from a top surface of the element to a bottom surface of the element.

Another aspect combinable with any of the previous aspects further includes operating the EDM system to form a transverse cut from one or more of the external surfaces toward a center portion of the nuclear fuel element.

In another aspect combinable with any of the previous aspects, operating the EDM system to form the bore includes forming the bore from the transverse cut.

In another example implementation, a system includes a nuclear fuel material stock; and an electronic discharge machining (EDM) system configured to hold the nuclear fuel material stock and cut a portion of the nuclear fuel material stock to form a nuclear fuel element from the nuclear fuel material stock.

In an aspect combinable with the example implementation, the EDM system is further configured to form a plurality of nuclear fuel elements from the stock.

In another aspect combinable with any of the previous aspects, the EDM system is further configured to cut a particular perimeter shape of the nuclear fuel elements into the stock for each nuclear fuel element.

In another aspect combinable with any of the previous aspects, the particular perimeter shape includes a repeating pattern in the stock.

In another aspect combinable with any of the previous aspects, the EDM system is further configured to continuously cut the stock to repeatedly form the nuclear fuel elements in series.

In another aspect combinable with any of the previous aspects, the EDM system is further configured to make a single, uninterrupted cut in the stock to form the nuclear fuel elements.

In another aspect combinable with any of the previous aspects, the stock includes a metallic or ceramic nuclear fuel material.

In another aspect combinable with any of the previous aspects, the metallic nuclear fuel material includes fissionable or fertile nuclear fuel, such as uranium, thorium, or plutonium.

In another aspect combinable with any of the previous aspects, the particular perimeter shape includes one of triangular, hexagonal, circular, diamond, or octagonal.

In another aspect combinable with any of the previous aspects, the EDM system is further configured to form a bore through the nuclear fuel element.

In another aspect combinable with any of the previous aspects, the bore is circular.

In another example implementation, a heat exchanger includes a heat pipe including an evaporating region and a condensing region; and a tube bundle including one or more adjacent, parallel tubes, each tube forming a helix, wherein the tube bundle is configured to wrap around the condensing region of the heat pipe with the helix of each tube coaxial to the heat pipe.

In an aspect combinable with the example implementation, the evaporating region of the heat pipe is positioned adjacent to nuclear fuel.

In another aspect combinable with any of the previous aspects, the heat pipe is configured to contain a first fluid coolant for removing heat from the nuclear fuel.

In another aspect combinable with any of the previous aspects, the tube bundle is configured to contain a second fluid coolant for removing heat from the heat pipe.

In another aspect combinable with any of the previous aspects, the second fluid coolant flows uni-directionally through the tube bundle.

In another aspect combinable with any of the previous aspects, the second fluid coolant flows bi-directionally through the tube bundle.

In another example implementation, a heat exchanger system includes one or more heat exchangers, each heat exchanger including a heat pipe including an evaporating region and a condensing region; and a tube bundle including one or more adjacent, parallel tubes, each tube forming a helix, wherein the tube bundle is configured to wrap around the condensing region of the heat pipe with the helix of each tube coaxial to the heat pipe.

In an aspect combinable with the example implementation, the one or more heat exchangers are arranged in a rectangular lattice from an axial perspective.

In another aspect combinable with any of the previous aspects, the one or more heat exchangers are arranged in a hexagonal lattice from an axial perspective.

In another aspect combinable with any of the previous aspects, an axis of each heat exchanger is parallel to the axis of each other heat exchanger.

In another example implementation, a heat exchanger module includes a tube bundle including one or more adjacent, parallel tubes, each tube forming a helix; and a sheath configured for removable placement around a heat pipe, wherein the tube bundle is mounted to an outer surface of the sheath.

In another example implementation, a nuclear power system includes one or more nuclear fuel elements; and a heat exchanger including a heat pipe including an evaporating region and a condensing region; and a tube bundle including one or more adjacent, parallel tubes, each tube forming a helix, wherein the tube bundle is configured to wrap around the condensing region of the heat pipe with the helix of each tube coaxial to the heat pipe, and wherein each of the one or more nuclear fuel elements is in conductive contact with the heat pipe.

In an aspect combinable with the example implementation, each of the one or more nuclear fuel elements includes an annulus, and the heat pipe passes through each annulus.

In another aspect combinable with any of the previous aspects, each annulus is circular.

In another aspect combinable with any of the previous aspects, the evaporating region of the heat pipe is positioned adjacent the one or more nuclear fuel elements.

In another aspect combinable with any of the previous aspects, the heat pipe is configured to contain a first fluid coolant for removing heat from the one or more nuclear fuel elements.

In another aspect combinable with any of the previous aspects, the tube bundle is configured to contain a second fluid coolant for removing heat from the heat pipe.

In another aspect combinable with any of the previous aspects, the second fluid coolant flows uni-directionally through the tube bundle.

In another aspect combinable with any of the previous aspects, the second fluid coolant flows bi-directionally through the tube bundle.

In an example implementation, a nuclear power system includes: a plurality of nuclear fuel elements, each of the plurality of nuclear fuel elements including an annulus; and a plurality of heat pipes, each of the plurality of heat pipes configured to pass through the annulus of a respective one of the plurality of nuclear fuel elements in conductive thermal contact with the respective nuclear fuel element.

In an aspect combinable with the example implementation, each of the plurality of nuclear fuel elements has a particular perimeter shape.

In another aspect combinable with any of the previous aspects, the particular perimeter shape is hexagonal, and the plurality of nuclear fuel elements are arranged in a hexagonal lattice from an axial perspective.

In another aspect combinable with any of the previous aspects, the particular perimeter shape is quadrilateral, and the plurality of nuclear fuel elements are arranged in a quadrilateral lattice from an axial perspective.

In another aspect combinable with any of the previous aspects, the particular perimeter shape is circular, and the plurality of nuclear fuel elements are arranged in a circular lattice from an axial perspective.

In another aspect combinable with any of the previous aspects, an axis of each nuclear fuel element is parallel to the axis of each other nuclear fuel element.

In another aspect combinable with any of the previous aspects, each of the plurality of heat pipes is configured to contain a coolant for removing heat from the respective nuclear fuel element.

In another aspect combinable with any of the previous aspects, each of the plurality of heat pipes is removable from the annulus of the respective nuclear fuel element.

Another aspect combinable with any one of the previous aspect further includes a plurality of reflector elements. Each reflector element includes a quantity of neutron-absorbing material.

In another aspect combinable with any of the previous aspects, the quantity of neutron-absorbing material of each reflector element is adjustable.

In another aspect combinable with any of the previous aspects, the annulus is cylindrical.

In another example implementation, a nuclear fuel cell includes a nuclear fuel element having an outer perimeter shape and an annulus.

In an aspect combinable with the example implementation, the annulus is cylindrical.

In another aspect combinable with any of the previous aspects, the outer perimeter shape includes one of circular, triangular, quadrilateral, hexagonal, or octagonal.

In another example implementation, a nuclear reactor element includes an external duct, and an internal duct configured for removable insertion into the external duct, the internal duct including: a nuclear fuel region; a reflector region; and a shielding region.

In an aspect combinable with the example implementation, the internal duct further includes one or more of a heat exchanger region, a cladding region, or a moderating region.

In another aspect combinable with any of the previous aspects, the external duct further includes one or more coolant channels for communicating a coolant between the nuclear reactor element and one or more adjacent nuclear reactor elements.

In another example implementation, a nuclear instrumentation module includes an assembly of optical fibers. Each optical fiber a) includes one or more sensors, and b) is configured for removable installation in a nuclear power system.

In an aspect combinable with the example implementation, the nuclear power system includes a plurality of heat pipes; and each optical fiber is configured for removable installation at one of the plurality of heat pipes.

In another aspect combinable with any of the previous aspects, removable installation at one of the plurality of heat pipes includes insertion of the optical fiber into a sheath adjacent the heat pipe.

In another aspect combinable with any of the previous aspects, removable installation at one of the plurality of heat pipes includes insertion of the optical fiber into a cable access port of a housing of the heat pipe.

In another aspect combinable with any of the previous aspects, each optical fiber of the assembly of optical fibers extends from a common node of a fiber trunk to one of the plurality of heat pipes.

In another aspect combinable with any of the previous aspects, each optical fiber of the assembly of optical fibers extends from an individual node of a fiber trunk to one of the plurality of heat pipes.

In another example implementation, a nuclear fuel cell lifting system includes: a tether; a lifting hook coupled to an end of the tether and configured to link to an attachment of a fuel cell; and a lifting motor coupled to the lifting hook through the tether and configured to extend and retract the tether.

In an aspect combinable with the example implementation, the attachment of the fuel cell includes one or more of hooks, tabs, pins, friction scissor grabs, magnets, or grooves.

In another aspect combinable with any of the previous aspects, the attachment of the fuel cell is located on one or more of a top or a side of the fuel cell.

Another aspect combinable with any of the previous aspects further includes a radiation shielding cask for housing the fuel cell.

In another example implementation, a method of removing a fuel cell from a nuclear reactor system includes: positioning a lifting system over the fuel cell; extending, by a lifting motor, a tether having a hook coupled to an end of the tether; linking the hook to an attachment of the fuel cell; and retracting, by the lifting motor, the tether.

In an aspect combinable with the example implementation, positioning the lifting system over the fuel cell includes maneuvering the lifting system to a coordinate position corresponding to a position of the fuel cell.

In another aspect combinable with any of the previous aspects, positioning the lifting system over the fuel cell includes maneuvering the lifting system in free motion.

In another aspect combinable with any of the previous aspects, positioning the lifting system over the fuel cell includes maneuvering the lifting system along a track.

Another aspect combinable with any of the previous aspects further includes pulling, by the tether, the fuel cell into a radiation shielding cask.

In another example implementation, a radiation shield includes a first plate defining a first plane and including one or more first openings; and a second plate defining a second plane parallel to the first plane; the second plate including one or more second openings, at least one of the first plate or the second plate rotatable around an axis perpendicular to the first plane and the second plane.

In an aspect combinable with the example implementation, the radiation shield is mapped to a coordinate system corresponding with an overhead arrangement of fuel cells of a nuclear reactor.

In another aspect combinable with any of the previous aspects, a method of removing a fuel cell from a nuclear reactor system includes rotating at least one of the first plate or the second plate, at least one of the first openings aligns with at least one of the second openings to form a combined opening having a sufficient size to allow passage of a fuel cell through the combined opening.

In another aspect combinable with any of the previous aspects, when positioned atop a nuclear reactor, the combined opening aligns with a coordinate position of a fuel cell of the nuclear reactor.

In another aspect combinable with any of the previous aspects, the first plate and the second plate are rotatable by a multi-axis motor system.

In another aspect combinable with any of the previous aspects, extending, by the lifting motor, the tether comprises extending the tether through the combined opening.

In another aspect combinable with any of the previous aspects, retracting, by the lifting motor, the tether comprises retracting the tether through the combined opening.

In another example implementation, a static radiation shield is mapped to a coordinate system corresponding with an overhead arrangement of fuel cells of a nuclear reactor, including a plate having an opening. When positioned atop a nuclear reactor, the opening aligns with a region of the nuclear reactor corresponding to coordinate positions of multiple fuel cells.

In another example implementation, a method for forming nuclear fuel includes processing a portion of nuclear fuel material obtained from a first nuclear reactor; and forming, from the processed portion of nuclear fuel material, a fissionable nuclear fuel material for a second nuclear reactor different from the first nuclear reactor.

In an aspect combinable with the example implementation, the first nuclear reactor includes a light water nuclear reactor.

In another aspect combinable with any of the previous aspects, the second nuclear reactor includes a fast nuclear reactor.

In another aspect combinable with any of the previous aspects, the portion of nuclear fuel material includes an irradiated oxide fuel assembly that includes irradiated oxide fuel and cladding.

In another aspect combinable with any of the previous aspects, processing the portion of nuclear fuel material includes removing the irradiated oxide fuel from the cladding.

In another aspect combinable with any of the previous aspects, removing the irradiated oxide fuel from the cladding includes at least one of mechanically cutting, chopping, or grinding the irradiated oxide fuel.

In another aspect combinable with any of the previous aspects, the irradiated oxide fuel includes fuel pins.

In another aspect combinable with any of the previous aspects, processing the portion of nuclear fuel material includes breaking the irradiated oxide fuel into a plurality of irradiated oxide fuel particles.

In another aspect combinable with any of the previous aspects, breaking the irradiated oxide fuel includes releasing one or more fission product gases.

Another aspect combinable with any of the previous aspects further includes at least one of filtering or trapping at least a portion of the one or more fission product gases.

In another aspect combinable with any of the previous aspects, the plurality of irradiated oxide fuel particles include transuranic (TRU) actinides, fission products, and uranium.

In another aspect combinable with any of the previous aspects, the uranium includes uranium-235, uranium-234, uranium-236, and uranium-238.

In another aspect combinable with any of the previous aspects, processing the portion of nuclear fuel material further includes mixing the plurality of irradiated oxide fuel particles with an inert material to form a ceramic-metallic nuclear fuel.

In another aspect combinable with any of the previous aspects, the inert material includes at least one of zirconium, metallic uranium, or metallic plutonium.

In another aspect combinable with any of the previous aspects, the metallic uranium includes at least one of enriched uranium, depleted uranium, or natural uranium.

In another aspect combinable with any of the previous aspects, the metallic uranium includes alloyed uranium.

In another aspect combinable with any of the previous aspects, mixing the plurality of irradiated oxide fuel particles with the inert material includes at least one of: mixing the irradiated fuel particles with molten inert material; or mixing the irradiated fuel particles with particulate inert material and sintering the mixture of the irradiated fuel particles and particulate inert material.

Another aspect combinable with any of the previous aspects further includes adding at least one of zirconium, niobium, or chromium to the mixture of irradiated oxide fuel particles and inert material.

Another aspect combinable with any of the previous aspects further includes adding at least one of a thorium alloy or ceramic material to the mixture of irradiated oxide fuel particles and inert material.

Another aspect combinable with any of the previous aspects further includes sintering the mixture of irradiated oxide fuel particles, inert material, and the at least one of thorium alloy or ceramic material.

In another aspect combinable with any of the previous aspects, forming the fissionable nuclear fuel material includes molding the ceramic-metallic nuclear fuel within a form to form the fissionable nuclear fuel material.

In another aspect combinable with any of the previous aspects, the form includes a tube made from at least one of zirconium, graphite, carbide, ceramic, chromium, or a steel alloy.

Another aspect combinable with any of the previous aspects further includes adding sodium to the ceramic-metallic nuclear fuel within the form.

In another aspect combinable with any of the previous aspects, the form includes a tube made from cladding of the portion of nuclear fuel material.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B show a side and cross-sectional view of a square reactor cell.

FIGS. 4A and 4B show a top cross-sectional view of a square reactor cell and cells arranged in a square lattice.

FIGS. 5A and 5B show a side and cross-sectional view of a circular reactor cell.

FIGS. 6A and 6B show a top cross-sectional view of a circular reactor cell and cells arranged in a circular lattice.

FIGS. 8A and 8B show a side view and cross-sectional view of a reactor cell having a fuel lattice and structures located in a removable internal duct assembly.

FIGS. 13A-13C show a front view, side view, and cross-sectional view of cell lifting system.

FIGS. 14A-14C shows a side view, a cross sectional view, and a detailed cross-sectional view of a lifting hook of a cell lifting system.

FIGS. 18A-18C show a top view, a side view, and an isometric view of a reactor module cover shield.

FIG. 20 shows a fuel formed by an EDM process having conventional fuel pin geometry as used in a typical light water nuclear reactor (LWR).

FIG. 21 shows top views of example fuel element geometries formed through an EDM process.

DETAILED DESCRIPTION

Implementations of the present disclosure include support systems and components of small reactors that are designed to provide long lasting and resilient power in a distributed fashion. In some implementations, reactors incorporate heat pipes into their design and cooling. Heat pipes can enable various degrees of modularity and redundancy in reactor design, so fuel systems, instrumentation, and refueling systems that utilize this modularity are important. In some examples, a fuel cell surrounds each heat pipe. The heat pipes can be placed through the center of the cells, with the cells placed in a hexagonal, square, or circular pattern, among other patterns.

Reactors can incorporate heat pipes into their design and cooling. Reactors can incorporate liquids, gases, or supercritical fluids as coolants for cooling. Heat pipes can enable various degrees of modularity and redundancy in reactor design. Relatedly, fuel designs can enable various degrees of modularity and redundancy in reactor design. Fuel and cooling designs can be integrated in fashions such that cooling, fuel, shielding, structure, instrumentation, refueling systems, and other functional systems can be integrated to create modular systems to enable enhanced economic performance.

Figure 1A:
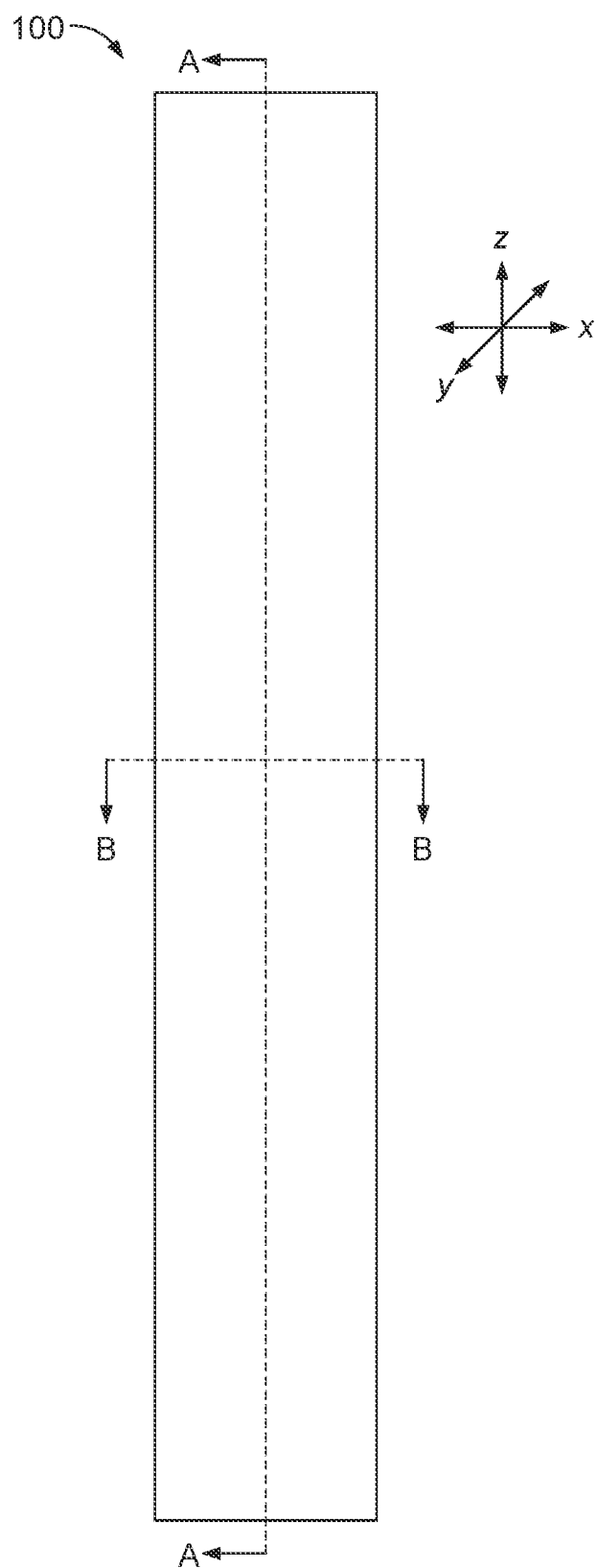
FIGS. 1A and 1B show a side and cross-sectional view of a hexagonal reactor cell.
Figure 1B:
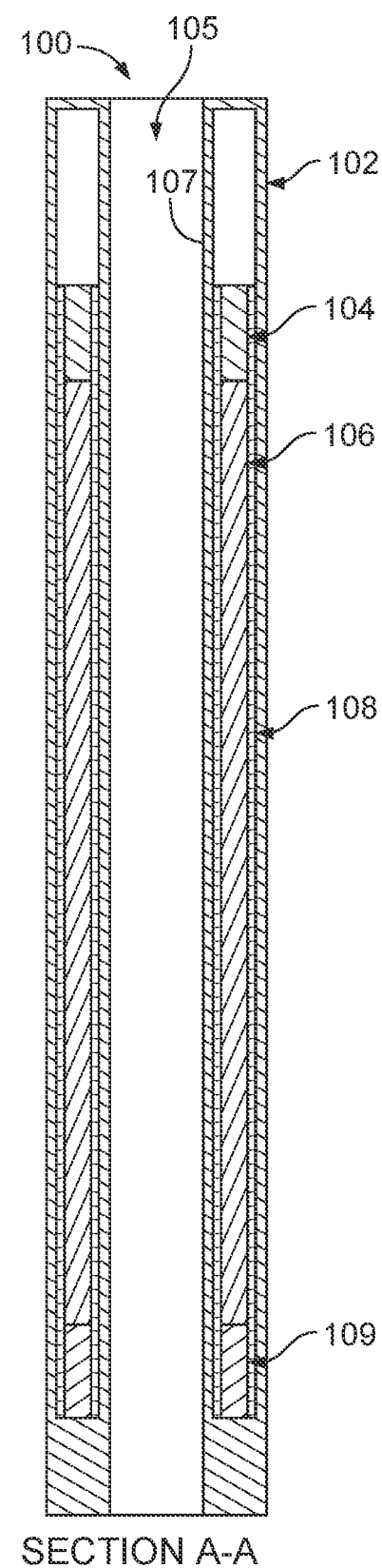

FIGS. 1A and 1B show a side and cross-sectional view of a hexagonal reactor cell 100. The reactor cell 100 includes an outer shell 102 an inner shell 107, and an annulus 105. The inner shell 107 defines an outer boundary of the annulus 105 in a radial direction, e.g., the x-direction. The reactor cell 100 can be removably positioned around a heat pipe, with the heat pipe passing through the annulus 105.

The reactor cell 100 includes a top reflector region 104, a bottom reflector region 109, fuel 106, and thermal bonding material 108. The fuel 106 is positioned between the inner shell 107 and the outer shell 102 in the radial direction. The fuel 106 is positioned between the top reflector region 104 and the bottom reflector region 109 in an axial direction, e.g., the z-direction. When installed in a nuclear reactor system, the z-direction of the reactor cell can correspond generally to the direction of gravity.

The thermal bonding material 108 can include, for example, powder, foam, liquid, or solid material. The thermal bonding material 108 can be positioned adjacent to the fuel to enhance heat distribution between fuel cells. In the example of FIG. 1B, the thermal bonding material 108 is positioned between the fuel 106 and the inner shell 107, and between the fuel 106 and the outer shell 102, in the radial direction. In some examples, the reactor cell 100 can also include thermal bonding materials that thermally couple a heat pipe to the reactor cell 100. In some examples, the reactor cell 100 can also include thermal bonding materials on its periphery or engineered onto exterior surfaces to thermally couple the reactor cell 100 with neighboring cells and structures.

Figure 2B:
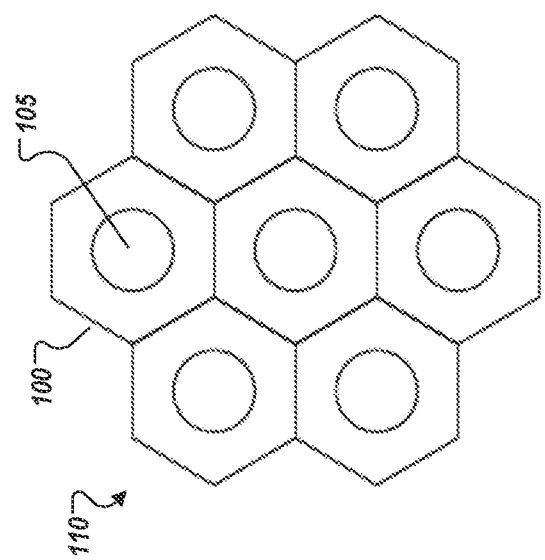
FIGS. 2A and 2B show a top cross-sectional view of a hexagonal reactor cell and cells arranged in a hexagonal lattice.
Figure 2A:
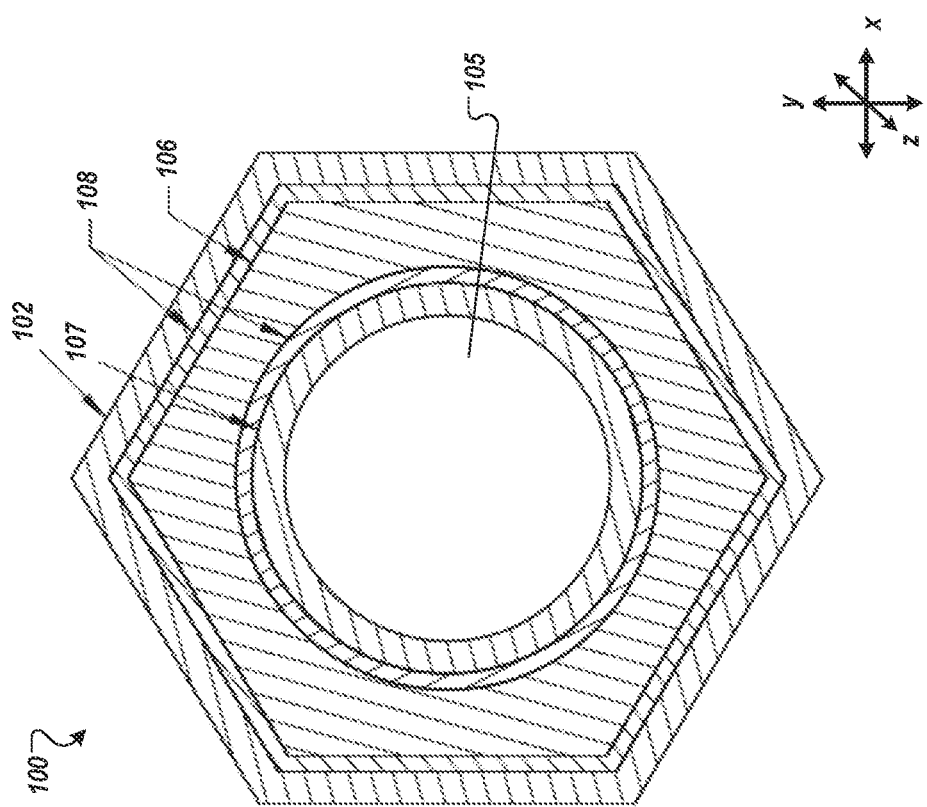

One or more fuel cell assemblies can be placed together in one or more structural assemblies that enable the heat exchangers to be placed onto or removed from one heat pipe, or a group of heat pipes, in a modular manner. FIG. 2A shows a top cross-sectional view of the hexagonal reactor cell 100. FIG. 2B shows multiple hexagonal reactor cells arranged in a hexagonal lattice 110.

As shown in FIG. 2A, the outer shell 102 has a hexagonal shape in the x-y plane. The hexagonal shape in the x-y plane allows the reactor cell 100 to be positioned in the hexagonal lattice 110. When positioned in the hexagonal lattice, the outer shell 102 is adjacent to the outer shells of at least two other reactor cells. Although shown as a hexagonal reactor cell in a circular lattice, other polygonal shapes are possible. For example, a reactor cell can have a pentagonal or octagonal shape in the x-y plane, and can be positioned in any polygonal lattice.

As shown in FIG. 2A, the inner shell 107 has a circular shape in the x-y plane. The circular shape in the x-y plane allows the reactor cell 100 to be positioned around a heat pipe having a circular cross-section. When positioned around a heat pipe, the inner shell 107 is adjacent to an outer surface of the heat pipe.

FIGS. 3A and 3B show a side and cross-sectional view of a square reactor cell 130. The reactor cell 130 includes an outer shell 112, an inner shell 117, and an annulus 115. The inner shell 117 defines an outer boundary of the annulus 115 in a radial direction, e.g., the x-direction. The reactor cell 130 can be removably positioned around a heat pipe, with the heat pipe passing through the annulus 115.

The reactor cell 130 includes a top reflector region 114, a bottom reflector region 119, fuel 116, and thermal bonding material 118. The fuel 116 is positioned between the inner shell 117 and the outer shell 112 in the radial direction. The fuel 116 is positioned between the top reflector region 114 and the bottom reflector region 119 in an axial direction, e.g., the z-direction.

The thermal bonding material 118 can include, for example, powder, foam, liquid, or solid material. The thermal bonding material 118 can be positioned adjacent to the fuel to enhance heat distribution between fuel cells. In the example of FIG. 3B, the thermal bonding material 118 is positioned between the fuel 116 and the inner shell 117, and between the fuel 116 and the outer shell 112, in the radial direction.

One or more fuel cell assemblies can be placed together in one or more structural assemblies that enable the heat exchangers to be placed onto or removed from one heat pipe, or a group of heat pipes, in a modular manner. FIG. 4A shows a top cross-sectional view of a square reactor cell 130. FIG. 4B shows a top cross-sectional view of multiple square reactor cells arranged in a square lattice 120.

As shown in FIG. 4A, the outer shell 112 has a square shape in the x-y plane. The square shape in the x-y plane allows the reactor cell 130 to be positioned in the square lattice 120. When positioned in the square lattice, the outer shell 112 is adjacent to the outer shells of at least two other reactor cells. Although shown as a square reactor cell in a square lattice, other quadrilateral shapes are possible. For example, a reactor cell can have a rectangular or diamond shape in the x-y plane, and can be positioned in any polygonal lattice.

As shown in FIG. 4A, the inner shell 117 has a circular shape in the x-y plane. The circular shape in the x-y plane allows the reactor cell 130 to be positioned around a heat pipe having a circular cross-section. When positioned around a heat pipe, the inner shell 117 is adjacent to an outer surface of the heat pipe.

FIGS. 5A and 5B show a side and cross-sectional view of a circular reactor cell 140. The reactor cell 140 includes an outer shell 122, an inner shell 127, and an annulus 125. The inner shell 127 defines an outer boundary of the annulus 125 in a radial direction, e.g., the x-direction. The reactor cell 140 can be removably positioned around a heat pipe, with the heat pipe passing through the annulus 125.

The reactor cell 140 includes a top reflector region 124, a bottom reflector region 129, fuel 126, and thermal bonding material 128. The fuel 126 is positioned between the inner shell 127 and the outer shell 122 in the radial direction. The fuel 126 is positioned between the top reflector region 124 and the bottom reflector region 129 in an axial direction, e.g., the z-direction.

The thermal bonding material 128 can include, for example, powder, foam, liquid, or solid material. The thermal bonding material 128 can be positioned adjacent to the fuel to enhance heat distribution between fuel cells. In the example of FIG. 5B, the thermal bonding material 128 is positioned between the fuel 126 and the inner shell 127, and between the fuel 126 and the outer shell 122, in the radial direction.

One or more fuel cell assemblies can be placed together in one or more structural assemblies that enable the heat exchangers to be placed onto or removed from one heat pipe, or a group of heat pipes, in a modular manner. FIG. 6A shows a top cross-sectional view of a circular reactor cell 140. FIG. 6B shows a top-cross-sectional view of multiple circular reactor cells arranged in a circular lattice.

As shown in FIG. 6A, the outer shell 122 has a circular shape in the x-y plane. The square shape in the x-y plane allows the reactor cell 140 to be positioned in the circular lattice 145. When positioned in the circular lattice 145, the outer shell 122 is adjacent to the outer shells of at least two other reactor cells. Although shown as a circular reactor cell in a circular lattice, other rounded shapes are possible. For example, a reactor cell can have an oval or elliptical shape in the x-y plane, and can be positioned in any rounded lattice.

As shown in FIG. 6A, the inner shell 127 has a circular shape in the x-y plane. The circular shape in the x-y plane allows the reactor cell 140 to be positioned around a heat pipe having a circular cross-section. When positioned around a heat pipe, the inner shell 127 is adjacent to an outer surface of the heat pipe.

Cells, or other types of elements, can be modified to achieve the desired performance of the reactor. In some examples, a subset of reactor cells can be dedicated to being reflectors, or modified reflectors. Reflector cells can accommodate absorbing materials in discrete quantities so that desired reactivity targets can be achieved. Modified reflector cells can be placed in various positions in orientations among the reactor cell lattices.

Modified reflector cells can be of a solid form, with holes or slots present, where absorbing materials, such as boron carbide, cadmium, hafnium, or gadolinium oxide can be added. This configuration enables placement of the modified reflector cells in preferred locations, as well as the capability to tune absorption characteristics of the modified reflector cells. The ability to tune the absorption characteristics can be accomplished by removing or adding absorbing materials, or replacing the absorbing materials with different absorbing materials with different properties. Thus, fixed reactivity suppression apparatus can be tuned at initial startup and/or during operation, to account for uncertainties in nuclear data that can affect the reactivity performance of the system. Tunable reactivity suppression apparatus can also be used to increase the operational lifetime of the reactor without adding or removing fuel, but instead by removing the absorbing materials.

Figure 7A:
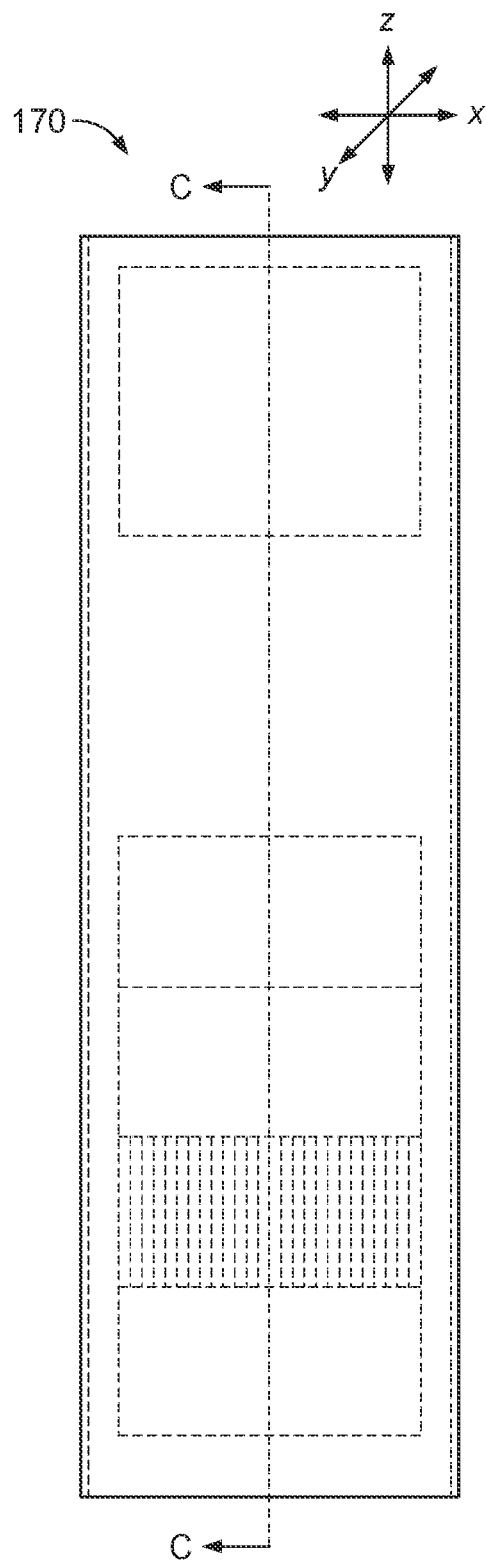
FIGS. 7A and 7B show a side view and cross-sectional view of a reactor cell having a fuel lattice, and other structures in the cell.
Figure 7B:
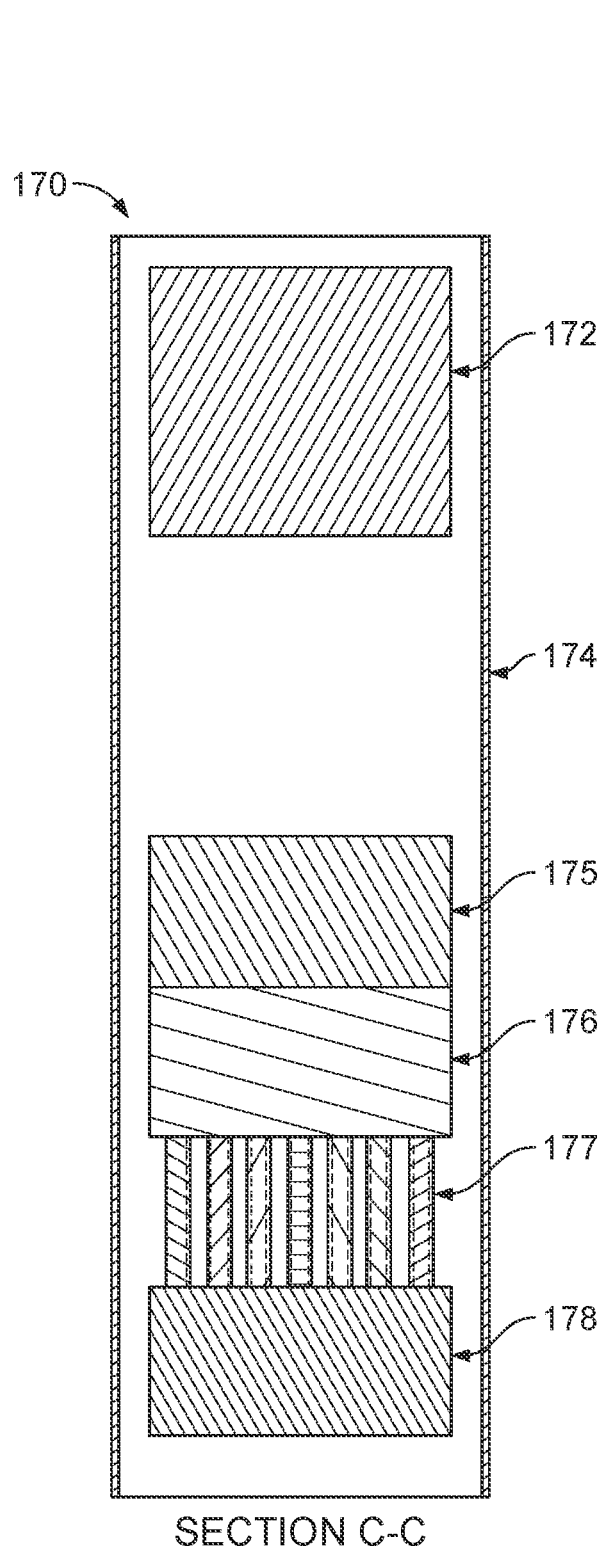

FIGS. 7A and 7B show a side and cross-sectional view of an example reactor cell 170 with a fuel lattice, and other structures in the reactor cell. Fuel in variety of forms can be designed such that cooling is via liquids, gases, or super-critical fluids in thermal contact with the fuel, providing a modular cooling flow path that includes both inlet and outlet flow paths in the same modular structure. Modular cooling flow paths can allow for a wide range of cooling system configurations that can afford the benefits of modular fabrication and construction, as well as the benefits in operations and maintenance afforded by replaceable cooling. Modular cooling flow paths can also reduce the requirements of larger containing structures, such as a vessel, to withstand high pressures of some coolants, such as supercritical fluids, by placing the pressure boundary at a smaller scale in the cooling pathway.

The example reactor cell 170 includes fuel pins 177, upper reflector 176, bottom reflector 178, and shielding 175. The reactor cell 170 also includes a heat exchanger 172. The components of the reactor cell are positioned inside an external duct 174. Thus, the reactor cell 170 includes an integral, modular system within the external duct 174 that contains fuel, coolant, reflectors, shielding, structure, flow guides, and other components. Altogether, this creates a modular system that can enable scalability as well as economic benefits.

In some implementations, the fuel can be in the form of cylinders, pins, or other closed structures, e.g., the fuel pins 177. In these implementations, the coolant can flow around external surfaces of the fuel. Fuel structures can resemble lattice-type fuel structures, which can increase heat transfer surface areas from the fuel. The fuel can be positioned within materials that contain the fuel and the resulting byproducts from irradiation. The materials can take the form of cladding, or cladding-like structures and materials. In these configurations, decay heat can be removed, even without coolant flow through the reactor cell, due to the thermal transport properties of the coolant. In this way, requirements on coolant pumps or circulators can be reduced.

The fuel pins 177 can also be positioned in a way such that the pressure drop of coolant through the fuel region is reduced. This can enable natural circulation to be more readily achieved. The coolant can be allowed to thermally and hydraulically communicate with neighboring reactor elements via cross-flow or axial-flow pathways. This can be achieved via slots, holes, vents, or other structures in the exterior structures of the fuel module.

Areas in the fuel or the cooling pathways can be dedicated to housing moderating materials, such as hydrogen-containing materials, beryllium-containing materials, carbon-bearing materials, among others. This can reduce the total amount of fuel required, and can take advantage of space in the design that might otherwise be unused.

The reactor cell 170 includes the upper reflector 176 and the lower reflector 178. These reflectors 176 and 178, positioned below and above the fuel pins 177 in the axial direction (z-direction), can enhance neutronic performance of the fuel. Radiation shielding materials, e.g., shielding 175 can also be included to reduce radiation fields away from the fuel pins 177.

Thermal hydraulic performance can be enhanced by design features included in the fuel region, or outside of the fuel region. These can include fuel spacer structures that ensure adequate spacing for cooling, and can enhance cooling in key areas by inducing mixing or turbulence. Flow guides can be included to direct flow in preferred paths, including toward points of heat removal. Preferred paths can include flow pathways designed to assist natural circulation.

The reactor cell 170 includes the heat exchanger 172. The heat exchanger 172 removes heat from the coolant or cooling device, and is positioned in the modular structure of the reactor cell 170, away from the fuel. The heat exchanger 172 can be positioned above the fuel, below the fuel, or radially to the sides of the fuel in the x-direction. In some examples, the heat exchanger 172 can be a bayonet-like heat exchanger that can be inserted into an open space in the fuel. The heat exchanger 172 can contain a fluid flow inlet, a flow path for the fluid to remove heat from the fuel, and a fluid flow outlet.

FIGS. 8A and 8B show a side view and cross-sectional view of a reactor cell 180 having a fuel lattice and structures located in a removable internal duct assembly 183. The example reactor cell 180 includes fuel pins 187, upper reflector 186, lower reflector 188, and shielding 185. The reactor cell 180 also includes a heat exchanger 182. The components of the reactor cell 180 are positioned inside an external duct 184.

The external duct 184 can be designed to make removal and replacement of fuel and other consumable material more easily accomplished in order to reduce operating and maintenance requirements. For example, the reactor cell 180 includes an internal duct assembly 183. The internal duct assembly 183 contains various components of the reactor cell 180 and is removable from the external duct 184. In some cases, the external duct 184 might not be removed when other components are removed. For example, the structures within the internal duct assembly 183 can be removed separately from the external duct module.

In some examples, the reactor cell 180 can be fabricated in a manner so that the fuel pins 187 are fabricated separately from other structures. In this way, fuel handling can be performed separately from handling of other components. The fuel module can be assembled by loading the fuel into a pre-fabricated fuel module. The fuel can be a metal which can be fabricated via casting, such as gravity-assisted casting, or pressure-assisted casting. The mold can be made of single use materials such as quartz, or multiple use materials such as graphite.

To assemble the reactor cell 180, the fabricated fuel can be loaded onto a lower structure of the reactor cell 180, which also includes shielding and the lower reflector 188. Upper structures, including the upper reflector 186 and shielding 185, as well as thermal bonds, can then be placed onto the fuel. The upper structures of the module, such as cooling pathways, cooling devices, the heat exchanger 182, and other structures can be placed on a material stack that includes the fuel. Sealing welds can then be applied. A sealing weld can be, for example, a single orbital weld. These fabrication processes can take place in a glove box or hot cell.

In some implementations, heat removal can be performed by a heat pipe passing through an annulus of a reactor cell. A heat pipe can contain a low porosity foam or other low porosity material in its vapor space, either in specific locations in the heat pipe, or throughout the entire heat pipe. A low porosity material can be, for example, a material having a porosity of about 0.5% to about 10%. In some examples, a low porosity material can be material having a porosity of about 0.5% to about 3%. The low porosity material can enhance heat transfer characteristics. Though a pressure drop can be increased along the length of the heat pipe, the low porosity structure can increase the heat transfer surface area in contact with the vapor, while also providing surface area for adhesion and capillary action to improve condensation and liquid movement through the heat pipe. The low porosity material can also improve neutron reflection as well as gamma attenuation by removing a streaming pathway through the heat pipe vapor core.

In some examples, an instrumentation system can include modular sections for an array of one or more heat pipes in close proximity, with sensor nodes at each heat pipe. The sensors can be placed around the heat pipe, on top of the heat pipe, placed in a sheath tube next to the heat pipe, or placed on the heat exchanger associated with the heat pipe. In some examples, instrumentation such as gamma thermometers and micro fission chambers can be placed in sheaths around the heat pipes, between the heat exchangers, above the fuel, in-core, or ex-core for modularity and ease of replacement.

For heat pipes used to remove heat from a reactor core, the high thermal conductivity of the heat pipes can allow the temperature and other parameters of the core to be measured from the ex-core end of the heat pipe. Therefore, the sensors can then monitor the condition of the core remotely and monitor the status of each heat pipe including changes in temperature or operating conditions. The instrumentation and sensors can be bonded with a thermal bonding material, such as a powder, foam, liquid, or solid material to thermally couple the sensor to the heat exchanger assembly, heat pipe, or other component. One or more of these instrumentation assemblies can be grouped together in one or more instrumentation assembly packages that enable the sensors to be placed onto or removed from one heat pipe, or a group of heat pipes, in a modular manner.

Figure 9:
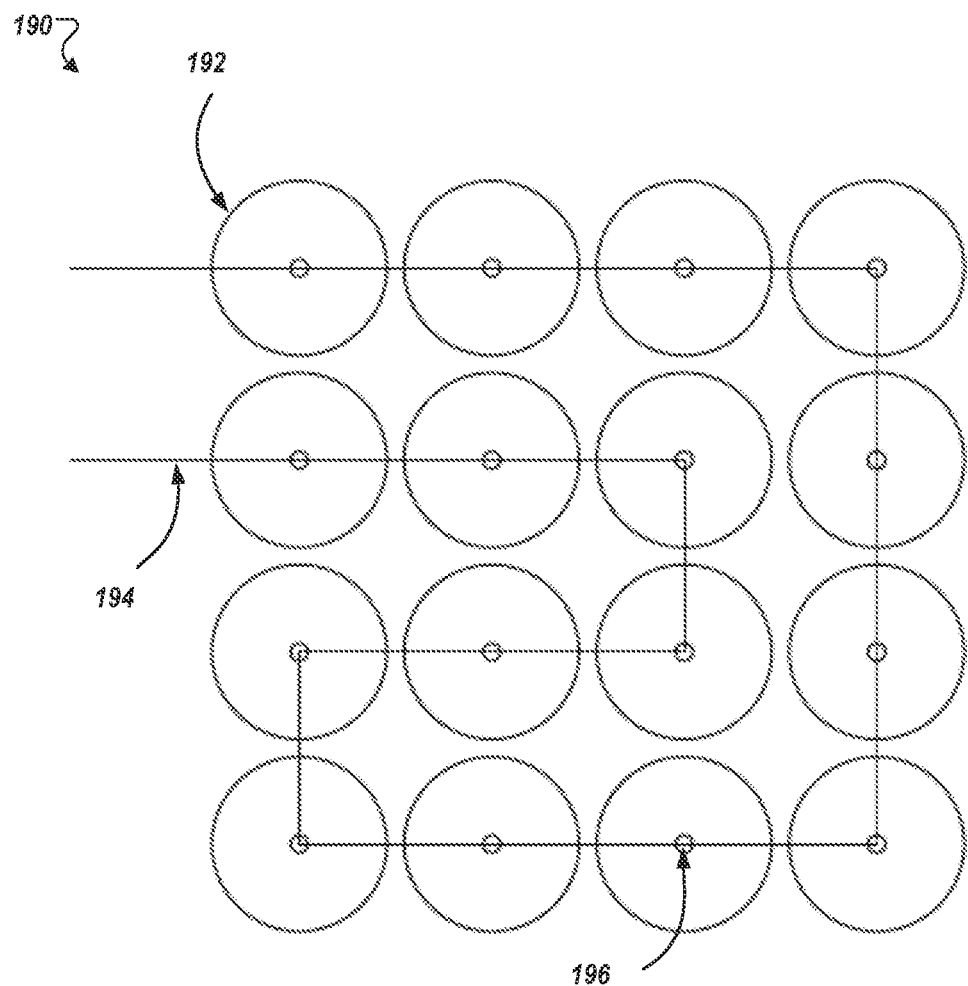
FIG. 9 shows a top of a group of heat pipes with a pathway method of routing instrumentation to each heat pipe.

FIG. 9 shows a top view of a group 190 of heat pipes 192. In the example of FIG. 9, distributed sensors are placed along a single cable pathway, or fiber trunk 194. Optical fibers with distributed fiber optic sensors are routed together in a few single paths, with each pathway containing multiple sensors in order to reach each heat pipe 192 in the group 190. Each fiber can extend from an individual node 196 of the fiber trunk 194. Each fiber can insert into a housing of one of the heat pipes 192 through a cable access port.

Figure 10:
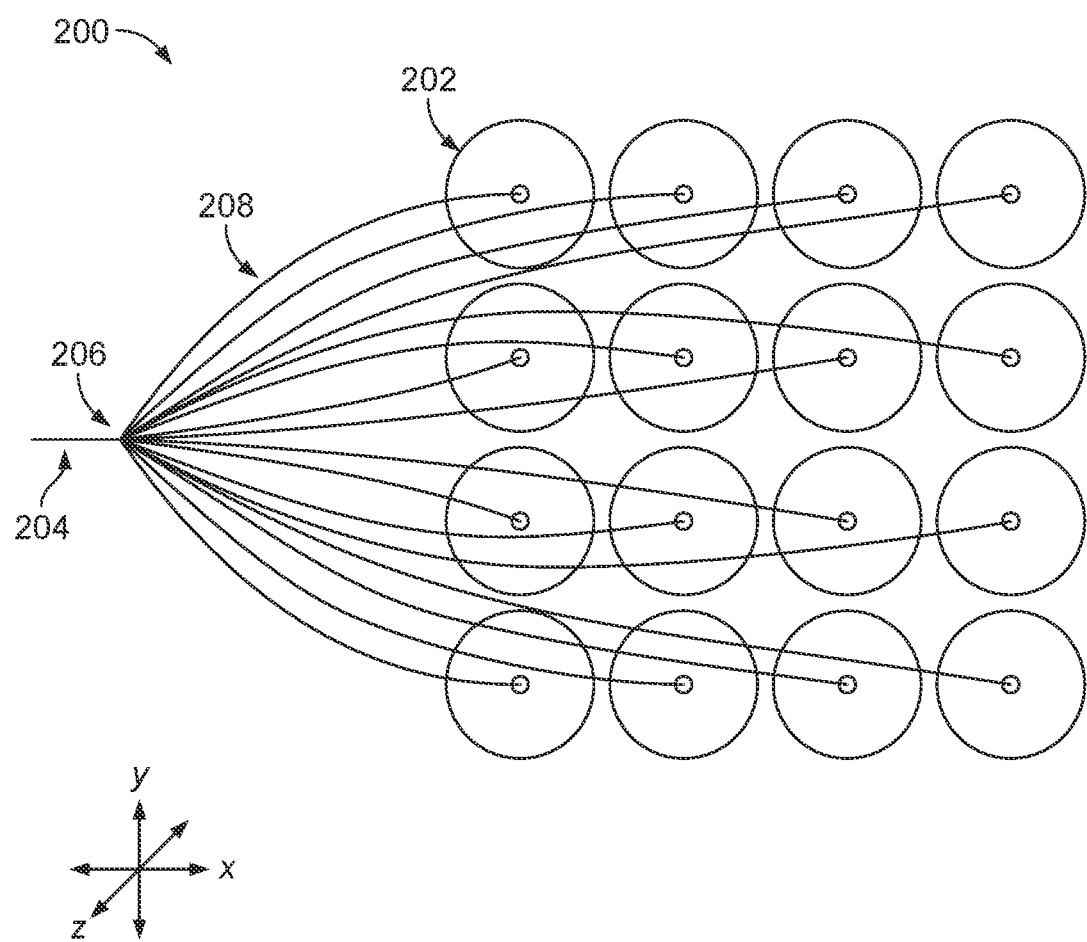
FIG. 10 shows a top of a group of heat pipes with an individual method of routing instrumentation to each heat pipe.

FIG. 10 shows a top view of a group 200 of heat pipes 202 that share a common fiber node 206. In the example of FIG. 10, individual sensors are routed to each heat pipe 202 from the common fiber node 206. Thermocouples or optical fibers with fiber point sensors have individual sensor paths 208 to each heat pipe 202 in the group 200. Several paths 208 can extend from a common grouping point, or common fiber node 206, of a fiber trunk 204. This can allow for modularity of instrumentation. For example, an individual fiber optic path 208 can be detached from the common fiber node 206 for repair or replacement.

Figure 11:
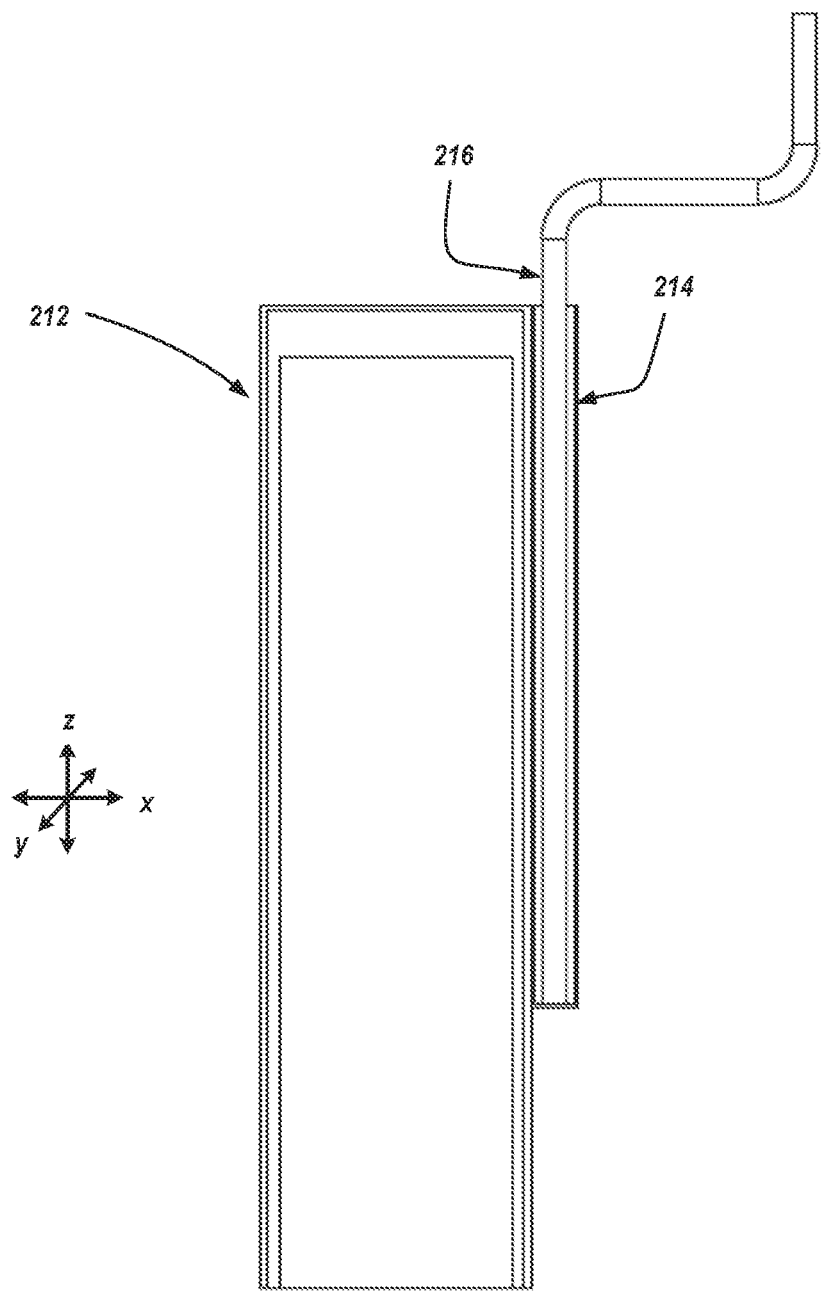
FIG. 11 shows a side cross-sectional view of a single sensor in a sheath next to a heat pipe.

FIG. 11 shows a side cross-sectional view of a single heat pipe 212 with an optical fiber sensor 216 inserted into a sheath 214 adjacent to the heat pipe 212. The sensor 216 in the sheath can branch from a multi-sensor sheath. For example, the sensor 216 can branch from an individual node 196, as shown in FIG. 9. As another example, the sensor 216 can branch from a common fiber node 206, as shown in FIG. 10.

Figure 12:
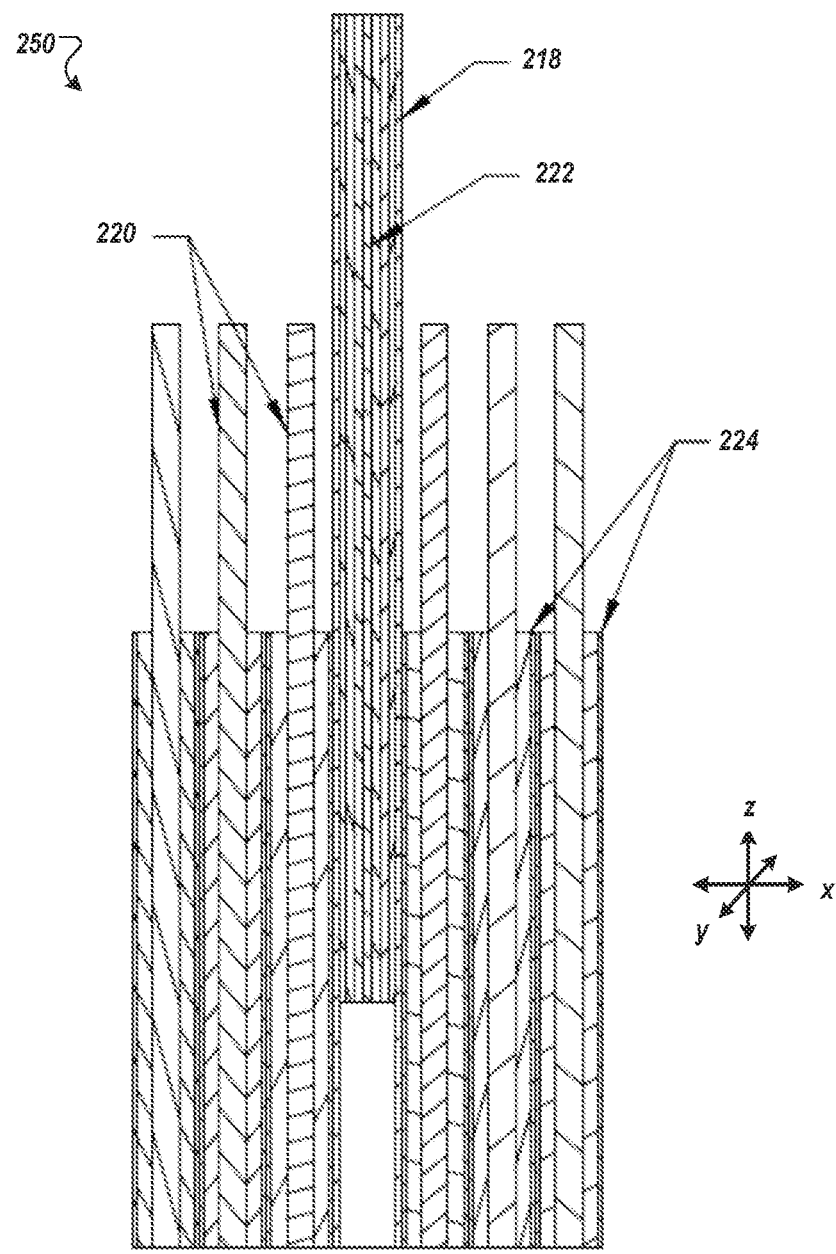
FIG. 12 shows a side cross-sectional view of instrumentation in a sheath in the core.

FIG. 12 shows a side cross-sectional view of instrumentation in a multi-sensor sheath 218 in a reactor core 250. The sheath 218 extends along the z-direction and inserts into the top of the reactor core 250. The sheath 218 is positioned towards the center of the reactor core 250 in the x-y plane.

The reactor core 250 includes fuel cells 224 and heat pipes 220. Each heat pipe 220 passes through an annulus of a fuel cell 224. The sheath 218 includes multiple sensor fibers 222. Individual sensor fibers 222 can branch from the sheath 218 to the heat pipes 220. In some examples, one sensor fiber branches from the sheath 218 to each heat pipe 220.

In an example operation of the reactor core 250, a nuclear power system including the reactor core 250 can be operated to produce heat or electrical power. An example process can include operating the reactor core 250 to produce electrical power and measuring parameters of the reactor core 250 using a nuclear instrumentation module. The example process can also include receiving data from an optical fiber of the nuclear instrumentation module, the optical fiber being installed at a heat pipe 220 of the reactor core 250. The data received from the optical fiber can indicate a measurement at the heat pipe. In some examples, the measurement at the heat pipe 220 can represent environmental conditions of the reactor core 250 at the heat pipe, e.g., a pressure, temperature, or both. In some examples, the measurement at the heat pipe 220 can represent a power level of the reactor core 250 at the heat pipe 220.

In some implementations, modular fuel cells of a reactor can be contained in a module container. The cells can be removed from the module for maintenance, repairs, or refueling. This can be done by a cell lifting or pulling system.

The lifting system can be an extension of an overhead crane or an independent system that moves over the reactor during maintenance and refueling. A cell lifting system as part of an overhead crane can utilize the crane's tether or it could have a separate cable and winch system. In some implementations, the crane can move the cell lifting system over each individual cell being removed. In some implementations, the crane can move the system over a general area of the reactor, and the cell lifting system can move to individual reactor cells independently.

FIGS. 13A-13C show a front view, side view, and cross-sectional view of cell lifting system 230. FIGS. 14A-14C show a side view, a cross sectional view, and a detailed cross-sectional view of a lifting hook 242 of the cell lifting system 230. The cell lifting system 230 can extract a spent cell 235, for example, through a cable tether system or through an extendible arm. An end of the tether or arm can have a hook, clamp, magnet, or suction system to attach to the cell.

The cell lifting system 230 includes a crane hook 232, a lifting motor 234, and a tether 236. The cell lifting system 230 can be used to remove a spent cell 235 from a reactor core using tether 236, which is controlled by the lifting motor 234. The spent cell 235 can include hooks, tabs, pins, or grooves on the top or sides of the cell to attach to the cell lifting system 230.

In some examples, the cell lifting system 230 can include a cell cask 238. The cell lifting system 230 can be used to load the spent cell 235 into the cell cask 238 for storage after removal from the reactor core. In some examples, the cell lifting system 230 can use the tether 236 to pull the spent cell 235 directly into the cell cask 238. In some examples, the spent fuel cask 238, as part of the cell lifting system, can be integrated with the crane tether or arm system. For example, the tether can pull the spent cell 235 directly into the cask 238 from the reactor module. The cask 238 can be sealed automatically or manually after the spent cell 235 is placed inside.

Figure 15B:
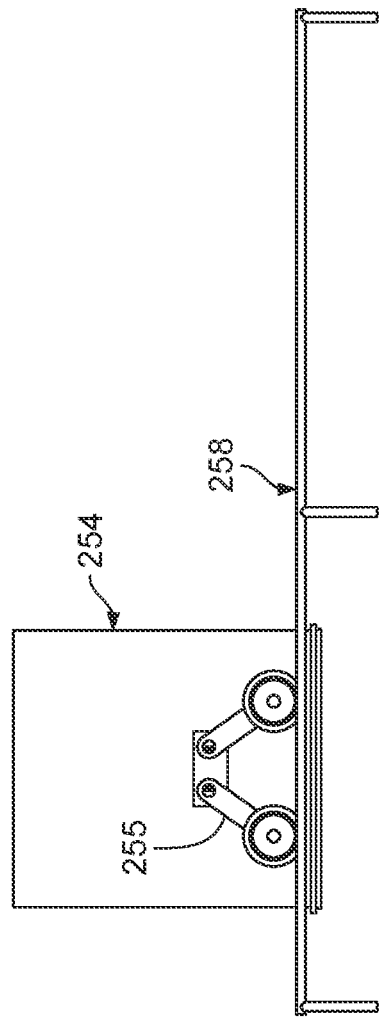
FIGS. 15A-15C shows a front view, a side view, and a cross-sectional view of a reactor module cover shield with a cell lifting system.
Figure 15C:
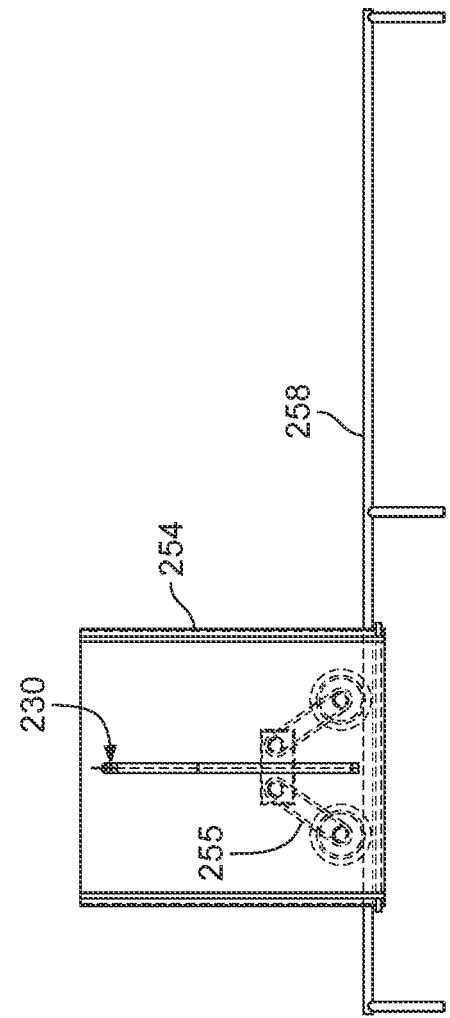
Figure 15A:
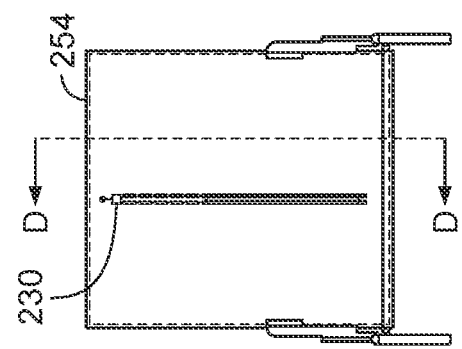

During maintenance and refueling, the reactor can be covered to prevent exposure from radiation. FIGS. 15A-15C show a front view, a side view, and a cross-sectional view of a reactor cover shield 254 with a cell lifting system. The cell lifting system can include a built-in cover shield 254, or can use a separate shield. In some implementations, the cover shield 254 can cover the entire cell lifting system 230. In some implementations, the cover shield 254 can be placed on top of the reactor module.

The cell lifting system 230 is a separate system from an overhead crane, and can include a power source and a movement mechanism 255. The power source can provide power to the movement mechanism 255 for moving the cell lifting system 230 over the reactor. The movement mechanism 255 can include, for example, a wheeled system, sliding system, or other movement system that enables movement over the reactor from module to module. In some examples, the cell lifting system 230 can move in free motion. In some examples, the cell lifting system 230 or can follow a track 258 to move over the reactor during maintenance and refueling.

The cover shield 254 can be made of a hard or flexible radiation resistant material. In order to allow cells to be removed while the reactor module is covered, the cover shield 254 can include openings. The openings can be large sections exposing the area of the reactor where maintenance is being performed, or they can be individual sections, e.g., for a single cell.

Figure 17:
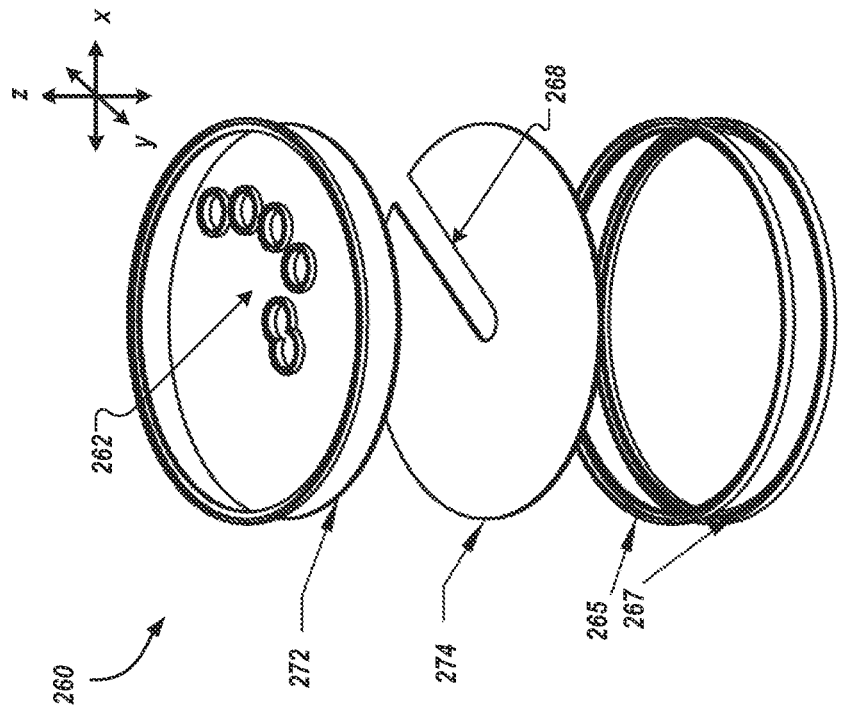
FIG. 17 shows an exploded view of a radiation shield cover.
Figure 16A:
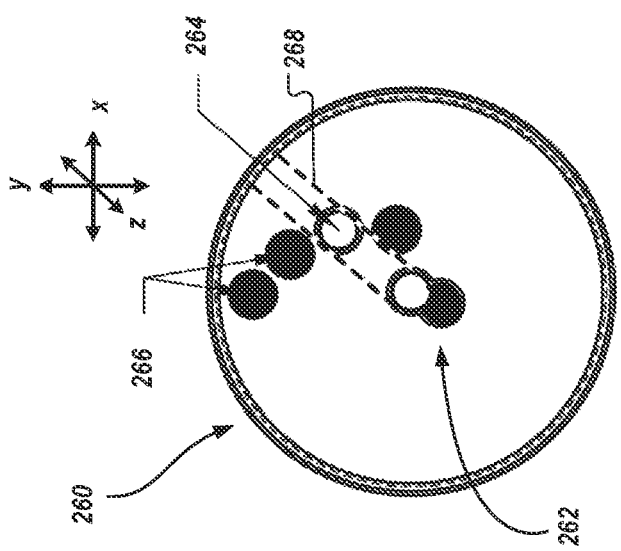
FIGS. 16A and 16B show a top view and side view of a radiation shield cover plate.
Figure 16B:
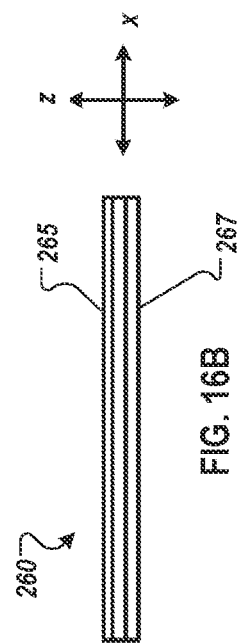

FIGS. 16A and 16B show a top view and side view of radiation shield cover 260 with multiple openings. FIG. 17 shows an exploded view of the radiation shield cover 260 with multiple openings.

In some examples, a shield cover 260 that has an opening for an individual cell can use a multi-axis motor system, e.g., a dual axis motor system. For example, the shield cover 260 can include a top plate 272 supported by top support ring 265 and a bottom plate 274 supported by bottom support ring 267, each including at least one opening, and each rotatable by a motor system. The shield cover 260 can be placed over the reactor and rotated in the x-y plane to allow overhead access to individual cells of the reactor.

The motor system can rotate the top plate 272 and the bottom plate 274 to align the openings over an individual cell. The shield cover 260 can be mapped to a coordinate system to line up the openings 262 with any cell in a circular, square, or hexagonal grid pattern, while the shield cover 260 covers other areas of the reactor. The coordinate system can include coordinates mapped to two or more axes (e.g., rectangular x and y axes, hexagonal axes) or can include circular polar coordinates.

In the example of FIGS. 16A-16B and 17, the top plate 272 includes top openings 262. Each of the top openings 262 has a shape and size that allows a reactor cell to pass through the opening. In the example of FIGS. 16A-16B and 17, the top openings 262 are circular. The bottom plate 274 includes a bottom opening 268. The bottom opening 268 extends from a center of the bottom plate 274 in the x-y plane to an edge of the bottom plate.

As the top plate 272 rotates with respect to the bottom plate 274, one or more of the top openings 262 and the bottom opening 268 can align. In the example of FIG. 16A, the top plate 272 and bottom plate 274 are aligned so that four of the top openings 262 of the top plate 272 do not align with the bottom opening 268. The subset of the top openings 262 that do not align with the bottom opening 268 are closed openings 266. The closed openings 266 are represented in FIG. 16A as shaded black circles. Two of the top openings 262 of the top plate 272 do align with the bottom opening 268. The subset of the top openings 262 that align with the bottom opening 268 are open openings 264. The open openings 264 are represented in FIG. 16A as white shaded circles.

The cell lifting system 230 can remove a first spent cell through one of the open openings 264. The top and bottom plates can then rotate to a new position to align an open opening over a second spent cell, and the cell lifting system 230 can remove the second spent cell.

FIGS. 18A-18C show a top view, a side view, and an isometric view of a reactor module shield cover 280 with a large opening 282. In the example of FIGS. 18A-18C, the shield cover 280 includes a static plate 284 with a large opening 282, or hole. The plate can be positioned over the reactor. The plate can be rotated in the x-y plane to expose a region of the reactor module while covering other regions.

In example operation of the cell lifting system 230, the cell lifting system 230 can be operated to remove a spent fuel cell from a reactor core. An example process can include selecting a cell to be removed from the reactor core. The process can include positioning the cell lifting system 230 over a location of the selected cell by maneuvering the movement mechanism 255. In some examples, the movement mechanism 255 maneuvers along the track 258 positioned over the reactor core.

The process can include rotating a radiation shield cover to expose the selected cell. The radiation shield cover can be, for example, the radiation shield cover 260 or the radiation shield cover 280. The radiation shield cover can be rotated to expose the selected cell by positioning one or more openings of the shield cover over the location of selected cell. The radiation shield cover can be rotated, e.g., using a motor system. In some examples, the motor system can be a dual axis motor system.

The example process can include lowering an arm or tether 236 of the cell lifting system through an opening in the shield cover. The process can include latching the spent cell 235 to the cell lifting system, e.g., using the lifting hook 242. The process can include removing the spent cell by lifting the spent cell through the opening in the shield cover using the arm or tether 236. The process can include loading the spent cell into a cell cask 238.

In some implementations, a fuel system can allow for direct use of previously used fuel in fast reactors. Fast reactors can use previously used fuel this because of their ability to tolerate large amounts of impurities, as well as their ability to fission the TRU actinides that include waste, and convert U-238 into fissile fuel. In some aspects, a fast reactor is a reactor that generates energy through fission caused by fast neutrons. A light water reactor, in contrast, generates energy through fission caused by thermal neutrons that are slowed by interaction with a water moderator. In a fast reactor, fast neutrons can cause fission in uranium-238, the dominant isotope of Uranium. Fast neutrons can also cause fission in actinides, which are a by-product of thermal fission. Thus, fast reactors can generate energy from waste produced by light water reactors.

Used fuel from light water reactors, which consists of irradiated oxide fuel in the form of pellets contained in zirconium alloy cladding tubes, can be directly reused in a fast reactor system. The first step is removing the fuel from the cladding. This can be accomplished by mechanically cutting, chopping, or grinding the fuel pins, among other techniques. The oxide fuel can then be mechanically broken down into smaller oxide particles or pieces by grinding or other techniques. This process releases fission product gases, as well as volatile fission products from the fuel. These fission products can be filtered or trapped.

The resulting oxide particles contain oxides of, for example, 1-3% transuranic (TRU) actinides, 1-3% fission products, and the remainder uranium. The uranium can be enriched to, for example, 1% Uranium-235. The uranium can contain trace amounts of Uranium-234 and Uranium-236, while the remainder is Uranium-238. The ground oxide fuel can be mixed with inert material such as zirconium; metallic uranium, which can be either enriched, depleted or natural uranium, which can be alloyed with elements like zirconium; or metallic plutonium that can also be alloyed. The resulting product is a ceramic-metallic mix.

This ceramic-metallic fuel mix can be made by mixing the oxide particulates with the molten uranium or plutonium material, and quenching quickly to prevent stratification. The metallic alloy can also be made into particulate form and mixed with the particulate oxide. This mix can then be sintered if desired. Non-fuel materials can be added as well to enhance irradiation and thermal performance, such as zirconium, niobium, or chromium.

Thorium alloys or ceramics can be used in this mix as well to achieve certain desired nuclear performance or thermal performance characteristics. This can be accomplished by mixing the used fuel oxide particles with a molten thorium metal, or solid thorium bearing compounds such as metals or ceramics. These can be sintered as well.

Figure 19:
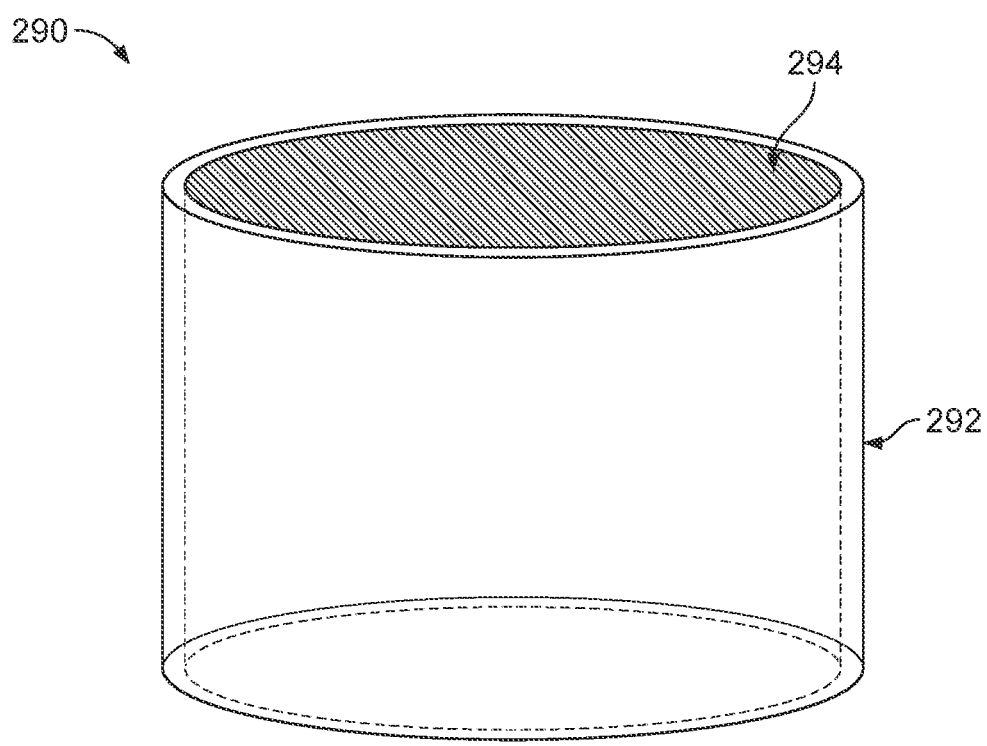
FIG. 19 shows an isometric view of an example fuel casting mold into which fuel particles can be poured and mixed.

FIG. 19 shows an isometric view of an example fuel casting mold 290. The mold 290 can be, for example, a sheath including an annular space 294 into which fuel particles can be poured and mixed. The mold 290 can include a tube 292. The tube 292 can be made from various materials, e.g., zirconium. Using the mold 290 to cast fuel can reduce material use and waste, while also providing a favorable fuel barrier, or rind. The resulting fuel form is a ceramic-metallic fuel pellet or slug with an outer zirconium layer, and can be loaded into cladding tubes made of appropriate materials, such as stainless steel alloys. Other materials can be used in the mold 290, such as, for example, graphite, carbides, other ceramics, chromium or steel alloys.

Sodium can be added to the fuel inside the cladding to provide a thermal bond. In the event that the fabrication process produces a relatively large amount of porosity in the fuel, this sodium can ensure appropriate thermal performance, allowing for more flexibility in fabrication The zirconium alloy hulls from the original used fuel cladding can be recycled and used to fabricate zirconium components used in this fuel system. It can also be used to fabricate zirconium used in other parts of the reactor, such as the neutron reflectors made from zirconium.

The fuel can also be fabricated by casting into a plate or sheet which is then rolled into the desired form. Multiple sheets can be cast and rolled to achieve the desired thickness, or a single plate can be used. In some examples, the resulting seam can be joined.

Nuclear fuel can be manufactured by casting or extruding fuel material to produce pins that are shaped as, in some examples, cylindrical elements. These cylindrical elements are the simplest and most common geometry for use in commercial nuclear reactors. As such, there is a well-developed fuel manufacturing industry worldwide having decades of experience in mass-producing this fuel element geometry with high quality assurance, at reasonable speed, and at relatively low cost.

However, other fuel element forms or geometries are less frequently produced, and are mainly used only in research reactors, test reactors, or reactors in use by governments and the militaries. These various forms are produced in a much lesser quantity and can be more expensive due largely to the slow rate of manufacture, specialized expertise and tooling required, and defect frequency in the manufacture of unusual fuel element geometries.

Likewise, the most commonly produced fuel type for commercial reactors is a ceramic fuel type, so metallic fuel manufacture is more uncommon and therefore more expensive due to the lack of mass manufacture economies of scale.

Casting and extruding fuel geometries other than cylindrical elements can present challenges for manufacture. For instance, and especially with metallic fuel materials, fuel with varying thickness or corners can warp or form unusual or undesired grain structures or residual stresses due to differential cooling across the volume of the fuel element. For geometries that involve a bore, extrusion can create distortion and casting causes issues due to the challenge of extricating the form used to create the annulus without either damaging the fuel or having portions of the form left in the fuel element after extrication.

In addition, the possible need for additional finishing steps on fuel elements after casting or extrusion adds costs and time to the manufacturing process. Finishing steps performed on both commercial and non-commercial nuclear fuel can include heat treatment steps or finish machining.

In some implementations, nuclear fuel, such as metallic nuclear fuel, can be formed using an EDM process. In some aspects, the formed nuclear fuel can comprise elemental shapes other than cylindrical, such as shapes with perimeters of hexagonal, triangular, square, rectangular, octagonal, or other form (e.g., rhombus). Generally, the EDM process forms the nuclear fuel elements from a stock piece of the nuclear fuel material. The nuclear fuel material can be fissionable or fertile nuclear fuel, such as uranium, thorium, or plutonium, in metallic or ceramic form.

The EDM process forms the nuclear fuel elements from the stock material by cutting into the stock with an electrical discharge arc formed between two electrodes. For example, material from the nuclear fuel stock piece is removed by a series of recurring current discharges between two electrodes that are separated by a dielectric liquid and subject to an electric voltage. In some aspects, the two electrodes include a "tool-electrode" and a "workpiece-electrode." The two electrodes do not make contact during the cutting process. When a voltage between the two electrodes is increased, an intensity of an electric field in a space between the electrodes becomes greater than the strength of the dielectric liquid. The dielectric liquid breaks down, allowing current to flow between the two electrodes. As a result, nuclear fuel material from the stock piece (that is positioned between the electrodes) is removed from both electrodes. New liquid dielectric can be replaced into the inter-electrode volume, enabling the stock debris to be carried away and the insulating properties of the dielectric to be restored.

Figure 22:
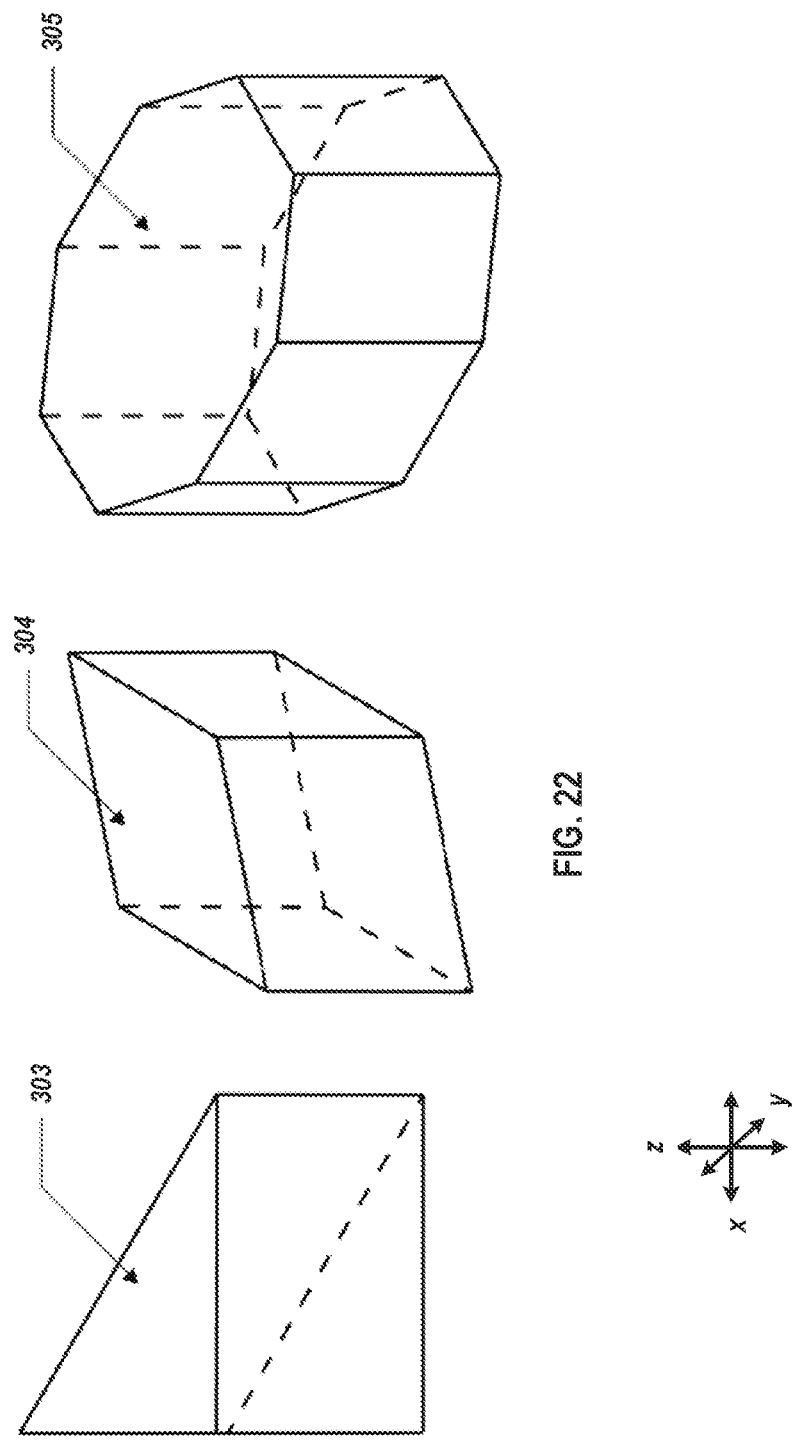
FIG. 22 shows isometric views of example fuel element geometries formed through an EDM process.

Example non-conventional shapes of nuclear fuel elements formed by the EDM process are shown in FIG. 20 and FIG. 21 (top view) and FIG. 22 (isometric view). FIG. 20 shows an example cylindrical fuel element 302. Other examples include a triangular fuel element 303, a diamond fuel element 304, and an octagonal fuel element 305). Other shapes, such as hexagonal, pentagonal, and other geometric shapes can also be used.

In some aspects, each of the shaped fuel elements shown in FIGS. 20, 21, and 22 can include an annulus, or bore there through. The bore can extend between a top surface FIG. of the particular fuel element and a bottom surface opposite the top surface. Thus, the axis of the bore can extend along the z-direction. The bore can be formed to receive, for example, a support structure or a cooling device (e.g., a heat pipe, coil, or other cooling device). Like the perimeter of the fuel element, the bore can be formed through an EDM process. The bore can be round, elliptical, square, or other shape.

Figure 23:
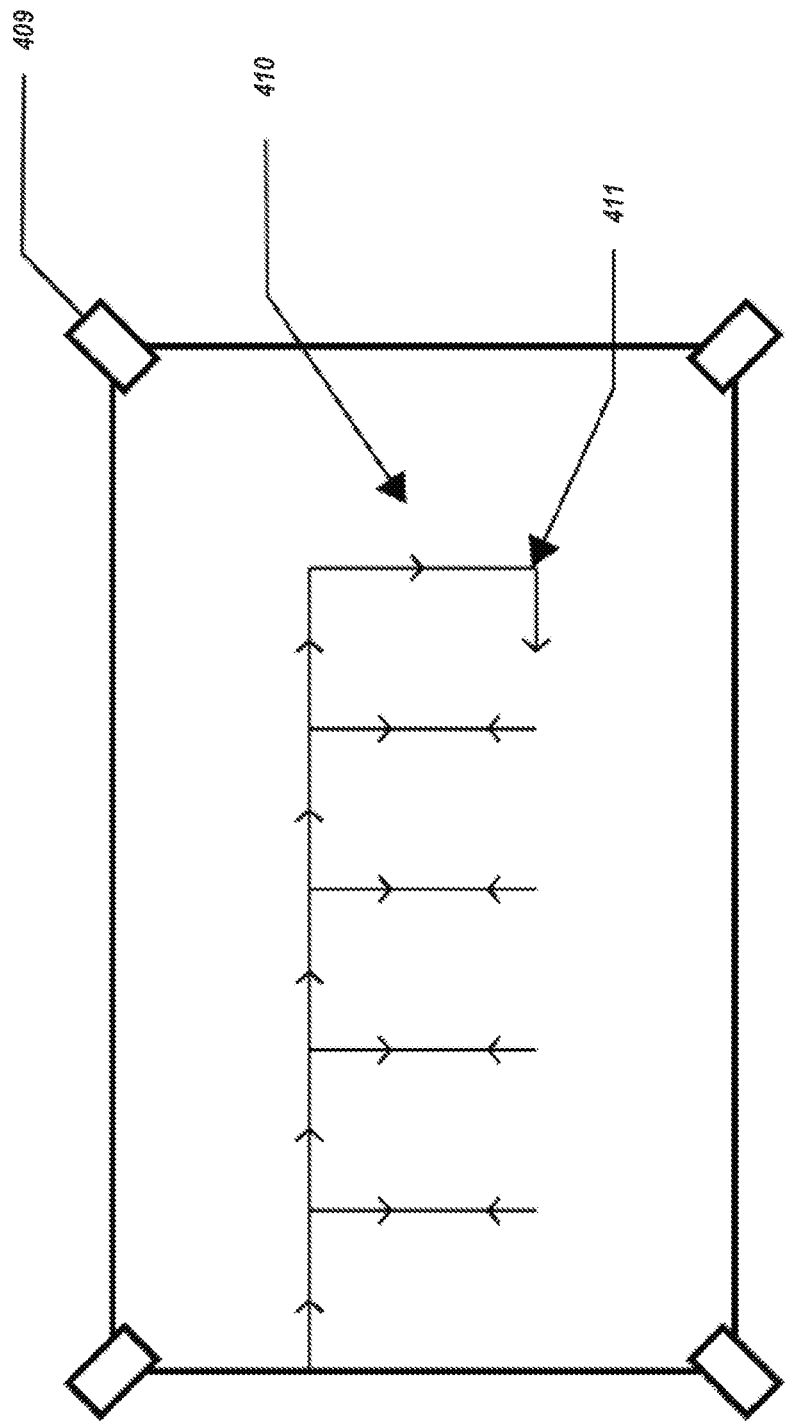
FIG. 23 shows an example machine path to produce an example fuel element geometry with an EDM process.
Figure 24:
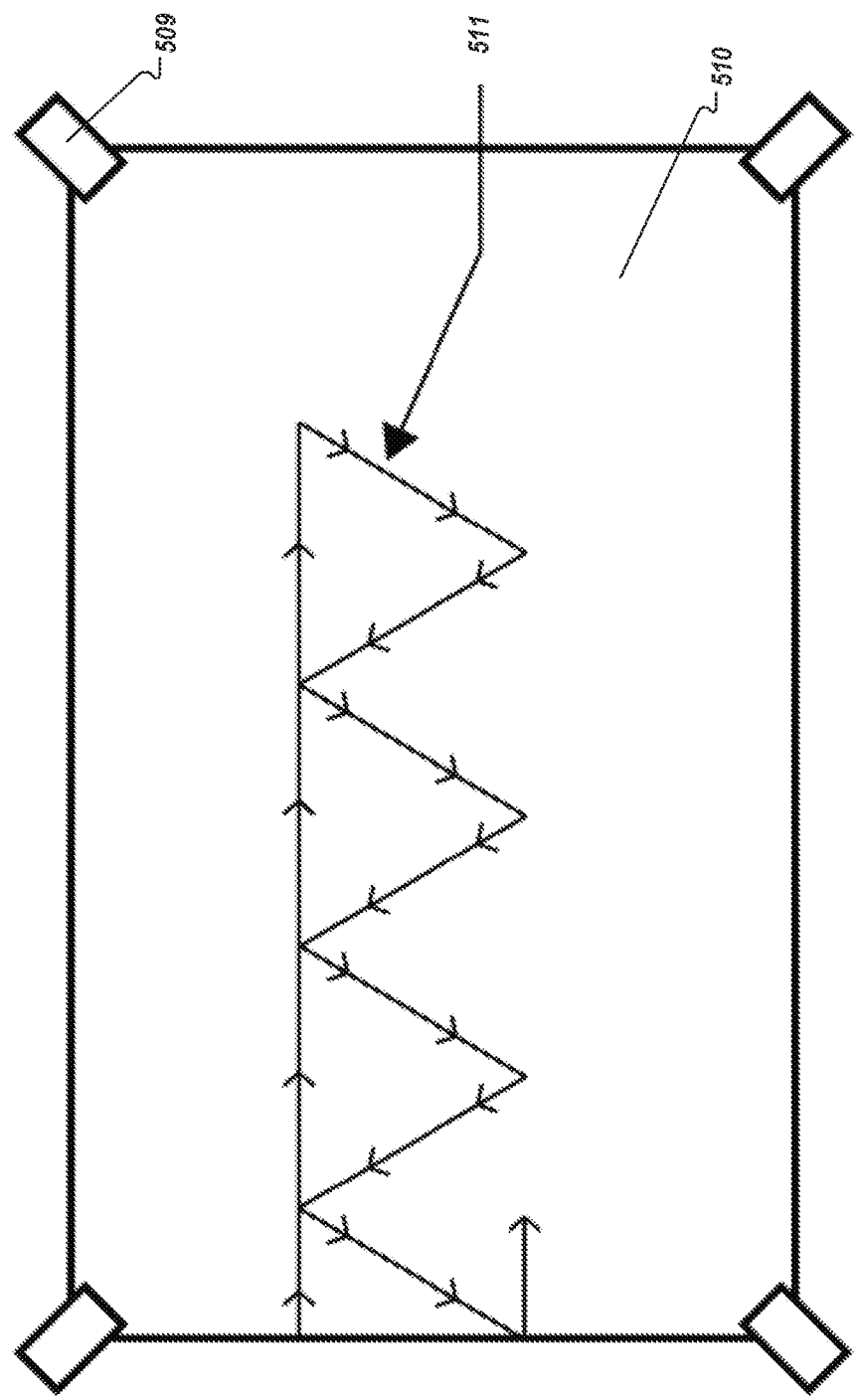
FIG. 24 shows an additional example machine path for a separate example fuel element geometry to be followed in an EDM process.

FIGS. 23 and 24 show example implementations of a nuclear fuel stock that can be used in an EDM process to form nuclear fuel elements. The shape, depth, or other dimension of the stock to be machined from can vary depending on the element geometry desired and the size of the EDM device. Likewise, the shape machined out of the stock can vary depending on the element geometry to be manufactured (e.g., as shown with elements 303, 304, and 305 shown in FIGS. 21 and 22).

FIG. 23 depicts an example machine path 411 for quadrilateral, e.g., rectangular, fuel element geometries. The machine path 411 can be arranged in repeatable patterns with stock 410 and constraints 409.

FIG. 24 depicts an example machine path 511 for triangular fuel element geometries. The machine path 511 can be arranged in repeatable patterns with stock 510 and constraints 509.

Figure 25:
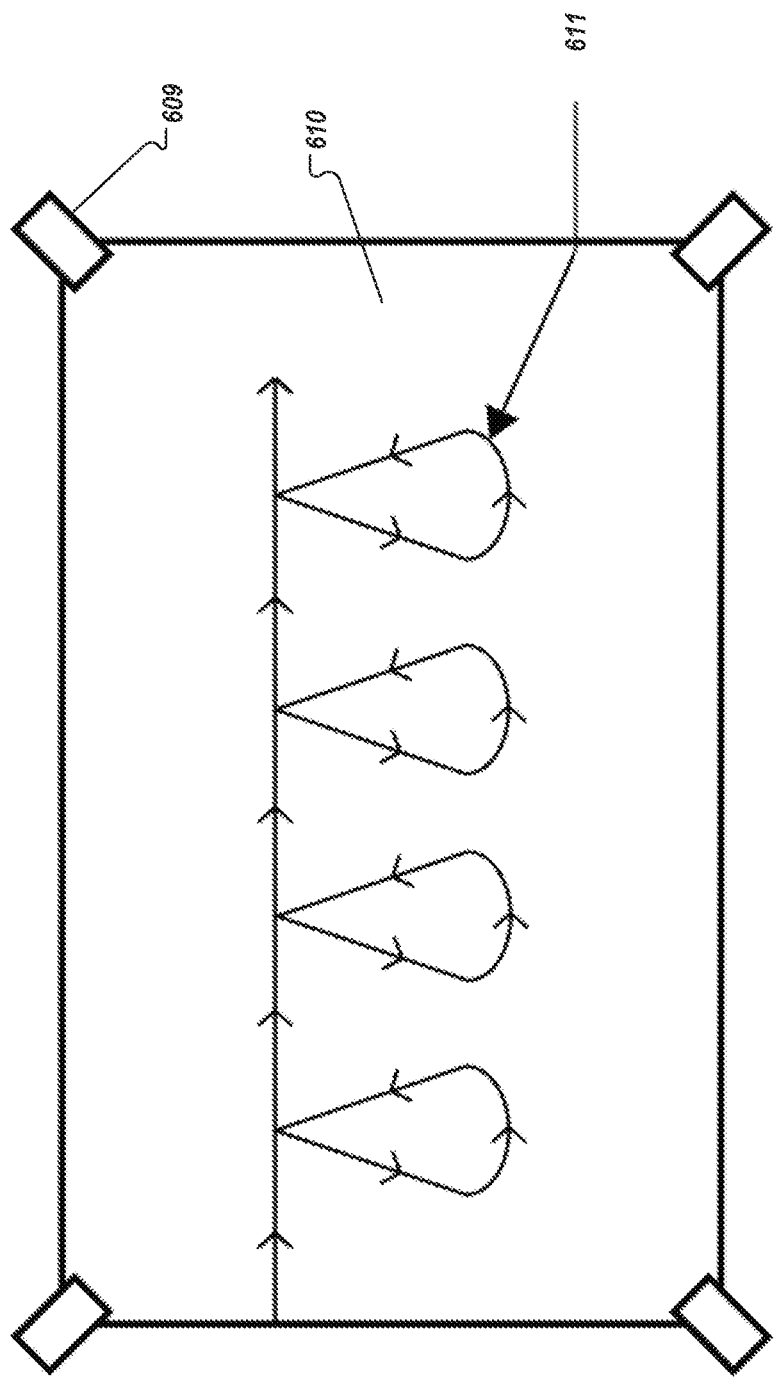
FIG. 25 shows an example machine path for an example fuel element geometry which is not exactly repeatable but can still be machined efficiently through an EDM process.

FIG. 25 shows another example implementation of a nuclear fuel stock 610 and constraints 609 that can be used in an EDM process to form nuclear fuel elements. FIG. 25 illustrates a possible application of this manufacturing method for fuel element geometries that are not exactly repeatable but can still be efficiently machined using this method. The machine path 611 can be used to form nuclear fuel elements of a rounded triangle, or teardrop, shape.

Figure 26:
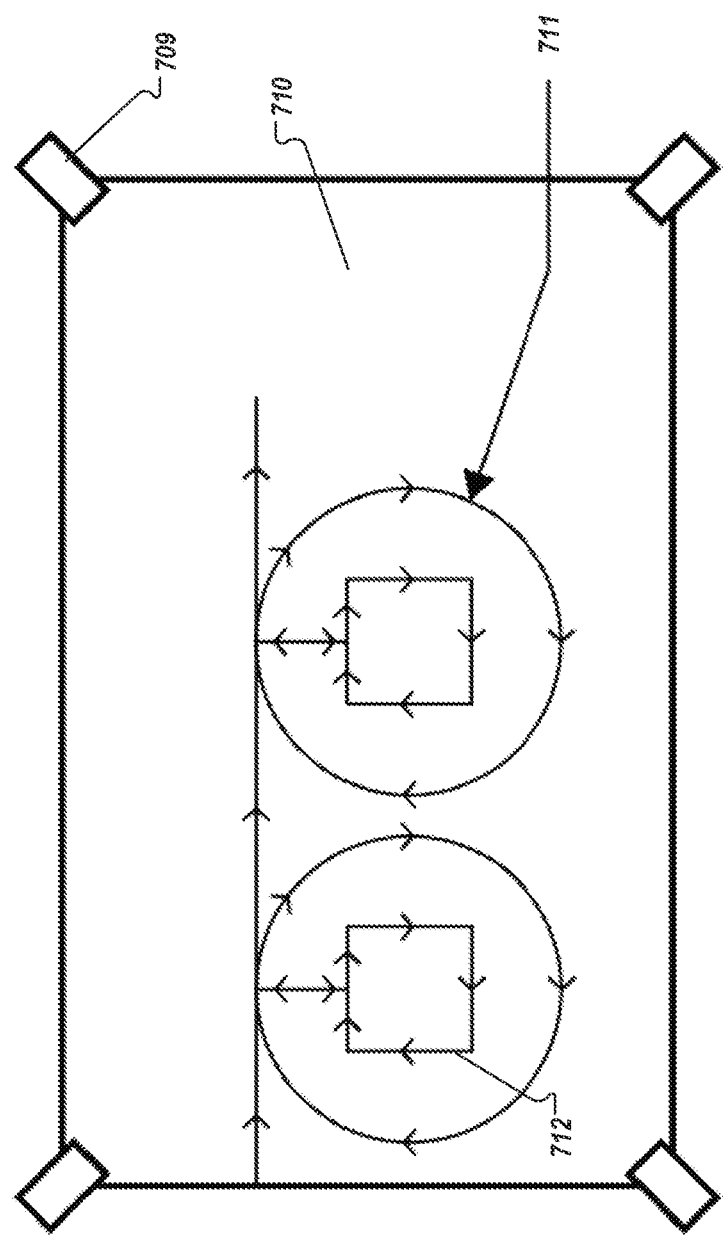
FIG. 26 shows an example machine path for an example fuel element geometry which is repeatable and additionally contains a bore formed through an EDM process.

FIG. 26 shows another example implementation of a nuclear fuel stock 710 and constraints 709 that can be used in an EDM process to form nuclear fuel elements. FIG. 26 depicts a possible repeatable fuel element geometry which additionally includes a bore 712 created by example machine path 711. Although machining separate bores into each fuel element can increase time and costs to produce the nuclear fuel elements relative to elements formed without a bore, the example method can present significant improvements over conventional manufacturing methods due to the substantive difficulty in casting or extruding fuel elements having a bore there through.

Figure 27:
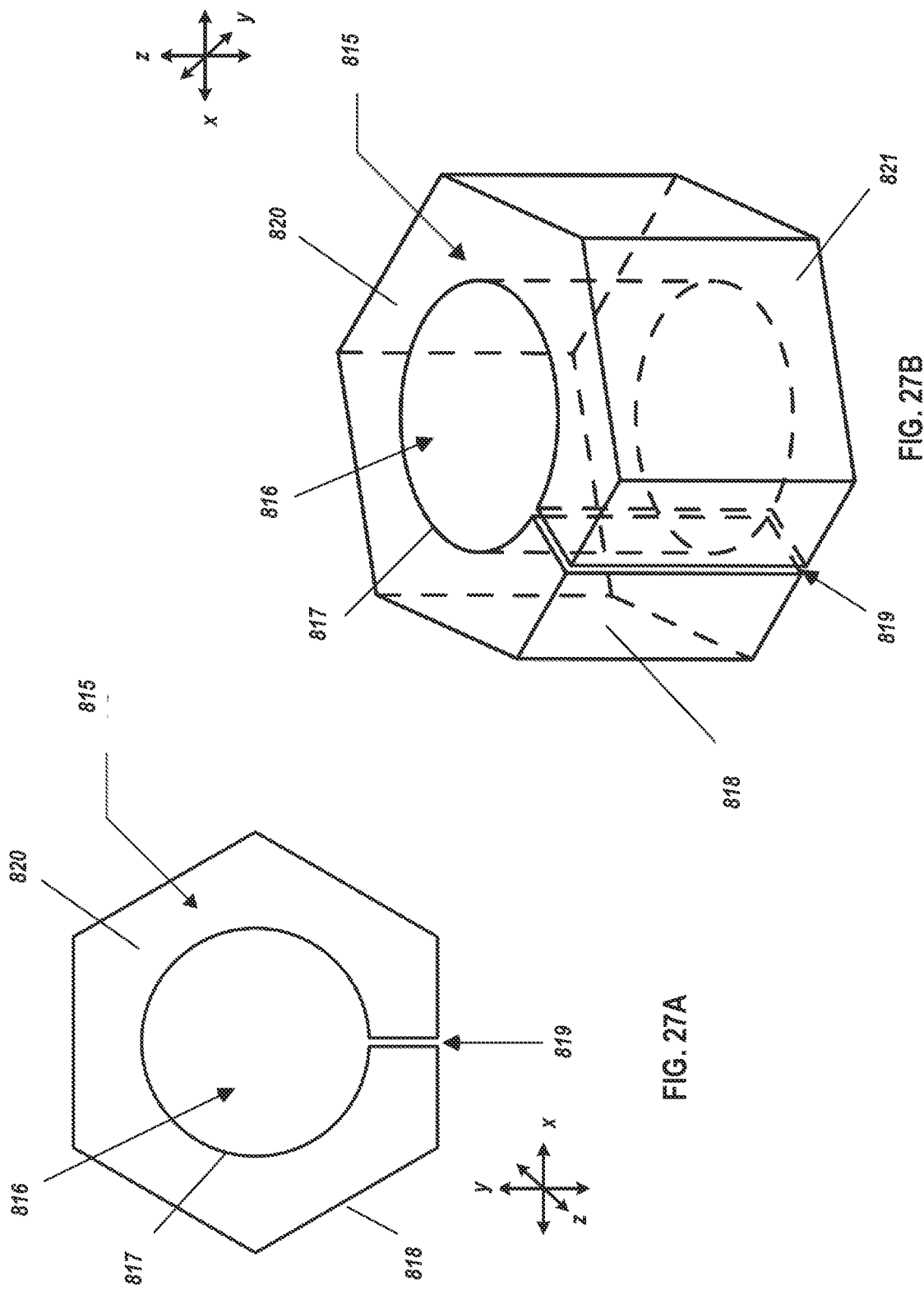
FIGS. 27A and 27B show a top view and an isometric view of another example fuel element formed through an EDM process which additionally contains a bore formed through the element.

FIGS. 27A and 27B show a top view and an isometric view, respectively, of an example fuel element 815 formed through an EDM process. In this example implementation, the fuel element 815 comprises a hexagonally shaped fuel element that includes a bore 816 formed from a top surface 20, through the fuel element 815, to a bottom surface 821. As shown in this example, the fuel element includes six external surfaces 818 and an internal, cylindrical internal surface 817. In alternative implementations, the bore 816 can be of a cross-section other that circular (e.g., square, rectangle, oval, or other geometric shapes) and the internal surface 817 can have a shape other than a cylinder (e.g., square cylinder, rectangular prism, oval cylinder, or other shapes).

As described in the present disclosure, the fuel element 815 can be formed from a stock of nuclear fuel material, such as metallic or ceramic material, through an EDM process. The fuel element 815 can be formed through a repeating process such that multiple fuel elements 815 can be formed from a single stock. In some aspects, multiple fuel elements 815 can be formed from a single stock in an EDM process that includes a single, continuous, cut through the stock. In alternative aspects, multiple fuel elements 815 can be formed from a single stock in an EDM process that includes multiple cuts through the stock.

As shown in the example fuel element 815, a transverse cut 819 extends radially through the fuel element 815 from a point on the external surface 818 to a point on the internal surface 817. For example, during the EDM process, the transverse cut 819 can be made once the external surfaces 818 are defined (e.g., by a cut or cuts of the EDM process) in order to form the bore 816. By forming the external surfaces 818, then the transverse cut 819 extending from the external surface 818 on one side of the element toward a center of the fuel element, and then the bore 816 (from the transverse cut 819), the EDM process can form the fuel element 815 with a single, uninterrupted cut. In some aspects, the transverse cut 819 can allow the fuel element 815 to expand without interruption or adverse effects during a nuclear reaction process that includes the fuel element 815.

In alternative aspects, the fuel element 815 might not include the transverse cut 819. For example, the fuel element 815 can be formed with two (or more) cuts during the EDM process. A first cut (or first set of cuts) can form the external surfaces 18. A second cut (or second set of cuts) can form the bore 816. In some aspects, the bore 16 can be formed prior to the external surfaces 818.

Figure 28:
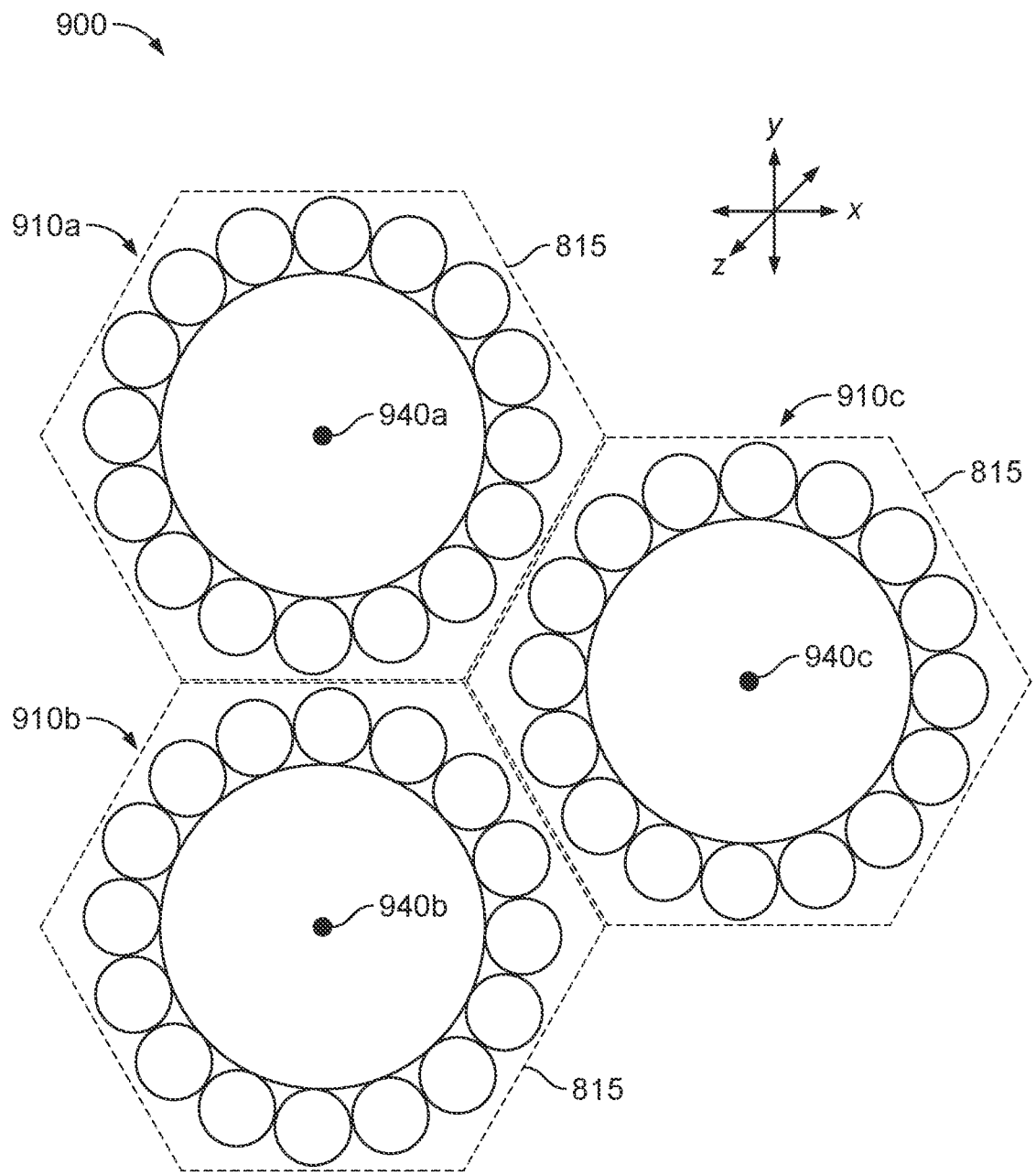
FIG. 28 shows an axial cross-sectional view of a heat exchanger system configured in a hexagonal lattice pattern.

FIG. 28 shows an axial cross-sectional view of a heat exchanger system 900 for removing heat from fuel elements, configured in a hexagonal lattice pattern. The heat exchanger system 900 is an array of multiple heat exchangers 910a, 910b, 910c, positioned in close proximity to one another. The heat exchangers 910a, 910b, and 910c are each centered on an axis 940a, 940b, and 940c, respectively. The axes 940 can be parallel to each other. As shown in this figure, the hexagonal lattice pattern of the heat exchanger system 900 can follow from hexagonal fuel elements 815, shown in dashed line. Each fuel element 815 can be positioned below evaporating regions of the respective heat exchanges 910a-c. A bore or annulus (e.g., circular) formed in each fuel element 815 receives the respective heat pipe about which the respective heat exchanger 910 is positioned.

The heat exchangers 910 are arranged in a hexagonal lattice such that, from an axial cross-sectional view perspective, the axes 940 each form a vertex of a triangular shape. Specifically, the axes 940 form an equilateral triangle. The heat exchanger system 900 can include any number of heat exchangers 910 positioned in the hexagonal lattice pattern.

Figure 29:
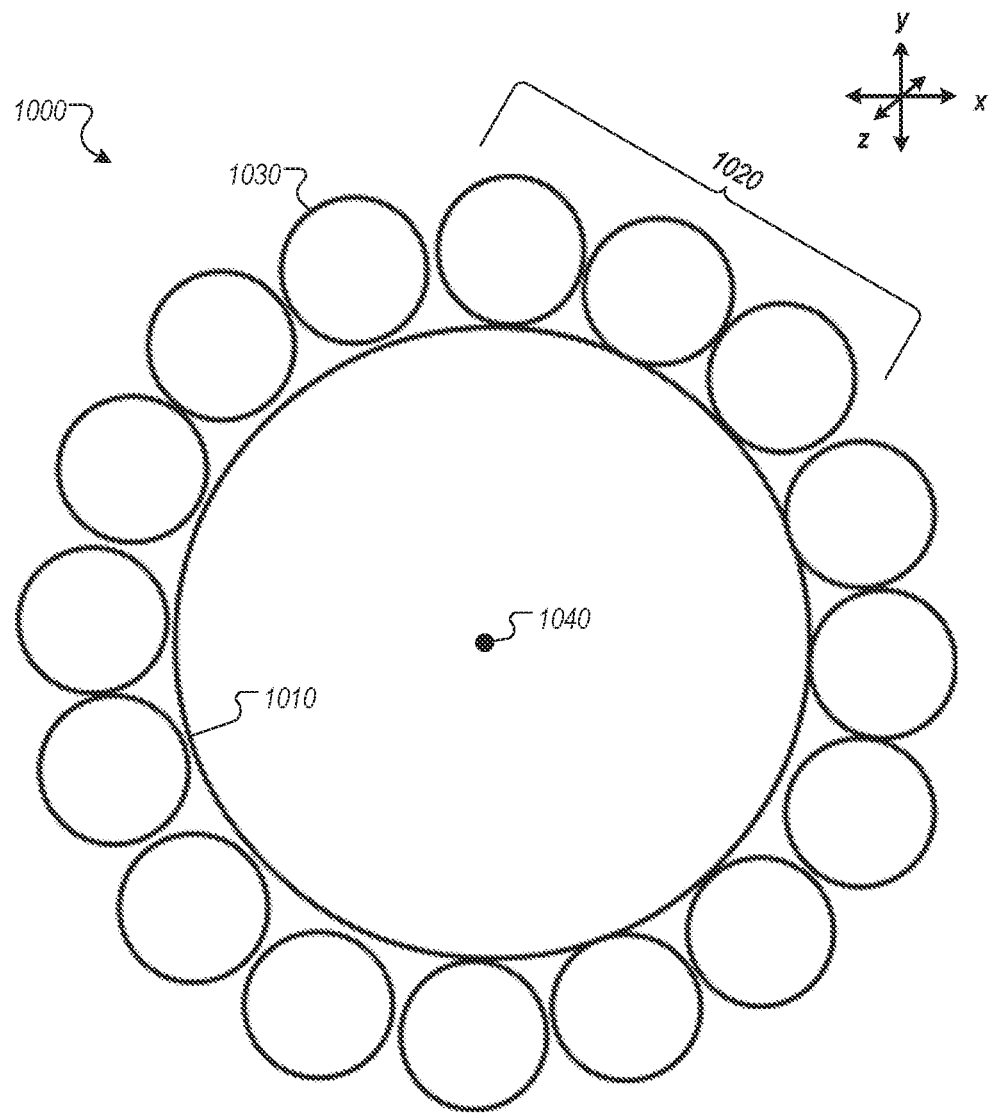
FIG. 29 shows a radial cross-sectional view of a heat exchanger.

FIG. 29 shows an axial cross-sectional view of a heat exchanger 1000. The heat exchanger 1000 includes a heat pipe 1010 and a tube bundle 1020. The tube bundle 1020 includes multiple adjacent, parallel tubes 1030. Each tube 1030 forms a spiral, or helix.

The tube bundle 1020 wraps around the heat pipe 1010. When the tube bundle 1020 is wrapped around the heat pipe

1010, the helix of each tube 1030 is coaxial to the heat pipe 1010, e.g., the helix and the heat pipe 1010 share an axis 1040.

The tube bundle 1020 of can be manufactured simply from light-weight materials. For example, the tube bundle 1020 can weigh 5 kilograms (kg), 7 kg, or 10 kg. The tube bundle 1020 can include narrow tubes 1030 with thin tube walls that are able to withstand high pressures. The tube walls can be able to withstand high pressures of, for example, 12 Megapascals (MPa), 15 MPa, or 20 MPa.

In some implementations, the heat exchanger 1000 can include a heat exchanger module. The heat exchanger module can include the tube bundle 1020 mounted to an outer surface of a sheath. For example, the tube bundle 1020 can be tack welded or bonded to the sheath. The sheath can be a tube that is designed to wrap around the heat pipe 1010. The heat exchanger module, including the sheath and the tube bundle 1020, can be removably placed around the heat pipe. The heat exchanger module can be removed from the heat pipe 1010 and placed around another heat pipe.

In some implementations, two or more heat exchanger modules can be mounted together in one or more structural assemblies. The structural assemblies can be placed on, and removed from, one or more heat pipes in a modular manner.

In some implementations, the heat exchanger 1000 can include a thermal bonding material positioned between and adjacent to the tubes 1030. The thermal bonding material can include, for example, a powder, foam, liquid, or solid material. The thermal bonding material can enhance heat distribution throughout the heat exchanger 1000. The thermal bonding material can also be used to thermally couple the heat pipe 1010 to the tube bundle 1020.

Figure 30:
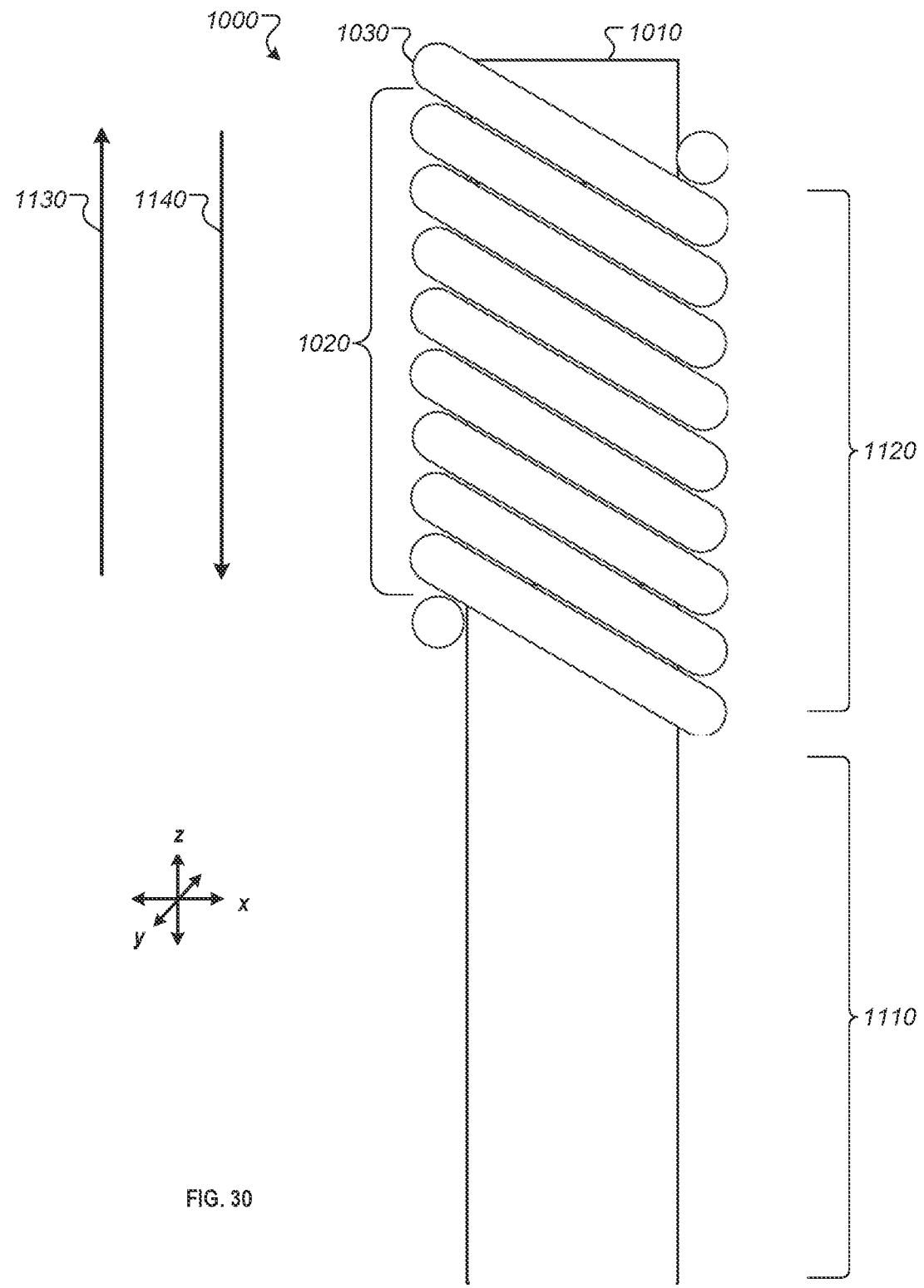
FIG. 30 shows a side perspective view of the heat exchanger.

FIG. 30 shows a side perspective view of the heat exchanger 1000. The heat pipe 1010 includes an evaporating region 1110 and a condensing region 1120. In some examples, the evaporating region 1110 can be positioned below the condensing region 1120 with respective to the direction of gravity. When installed in a nuclear fuel system, e.g., a nuclear reactor, the evaporating region 1110 of the heat pipe 1010 can be positioned adjacent to the nuclear fuel. Specifically, the heat exchanger 1000 can be installed with the evaporating region 1110 of the heat pipe 1010 passing through an annulus of a fuel element of the nuclear fuel system.

In some aspects, the heat pipe 1010 can pass through one or more nuclear fuel elements within a nuclear fuel system that are positioned below the evaporating region 1110, and not shown in this figure. In some examples, each nuclear fuel element can be formed with an annulus through which the heat pipe 1010 passes. In some aspects, each nuclear fuel element can be formed with a circular or substantially circular annulus and a perimeter that approximates, e.g., a hexagon, a square, or other shape. In some aspects, a nuclear fuel element is in conductive contact with the heat pipe 1010, either directly or through a heat transfer material.

The heat pipe 1010 can contain a first fluid coolant for removing heat from the nuclear fuel. The first fluid coolant can include, for example, alkali metals, halide salts, or other suitable working fluids for transporting heat away from the nuclear fuel. When installed in a nuclear fuel system, heat from the nuclear fuel can transfer by conduction through the walls of the heat pipe 1010 to the first fluid coolant. The first fluid coolant can change phase, e.g., through evaporation. Through convection, the first fluid coolant transfers the heat to the condensing region 1120 of the heat pipe 1010.

The tube bundle 1020 wraps around the condensing region 1120 of the heat pipe 1010. The tubes 1030 of the tube bundle 1020 can each contain a second fluid coolant for removing heat from the heat pipe 1010. The heat can transfer from the first fluid coolant to the second fluid coolant by conduction through walls of the heat pipe 1010 and the tubes 1030. The second coolant fluid can be, for example, a gas, a liquid, e.g., water, or a supercritical fluid, e.g., supercritical carbon dioxide. The second coolant fluid flows through the tubes 1030, transferring heat away from the heat pipe 1010. The first fluid can change phase, e.g., through condensation, as a result of heat removal.

Fluid within the tubes 1030 of the tube bundle 1020 can flow in any direction. In some examples, fluid within the tubes 1030 flows in an overall direction represented by arrow 1130. In some examples, fluid within the tubes 1030 flows in an overall direction represented by arrow 1140. In some examples, fluid within the tubes 1030 can alternate between flowing in the direction of the arrow 1130 and the direction of the arrow 1140.

The second fluid coolant within the tubes 1030 removes heat from the heat pipe 1010. The tubes 1030 can conduct the second fluid coolant to an outlet manifold. The second fluid coolant can then transfer the heat to a power conversion system.

Figure 31:
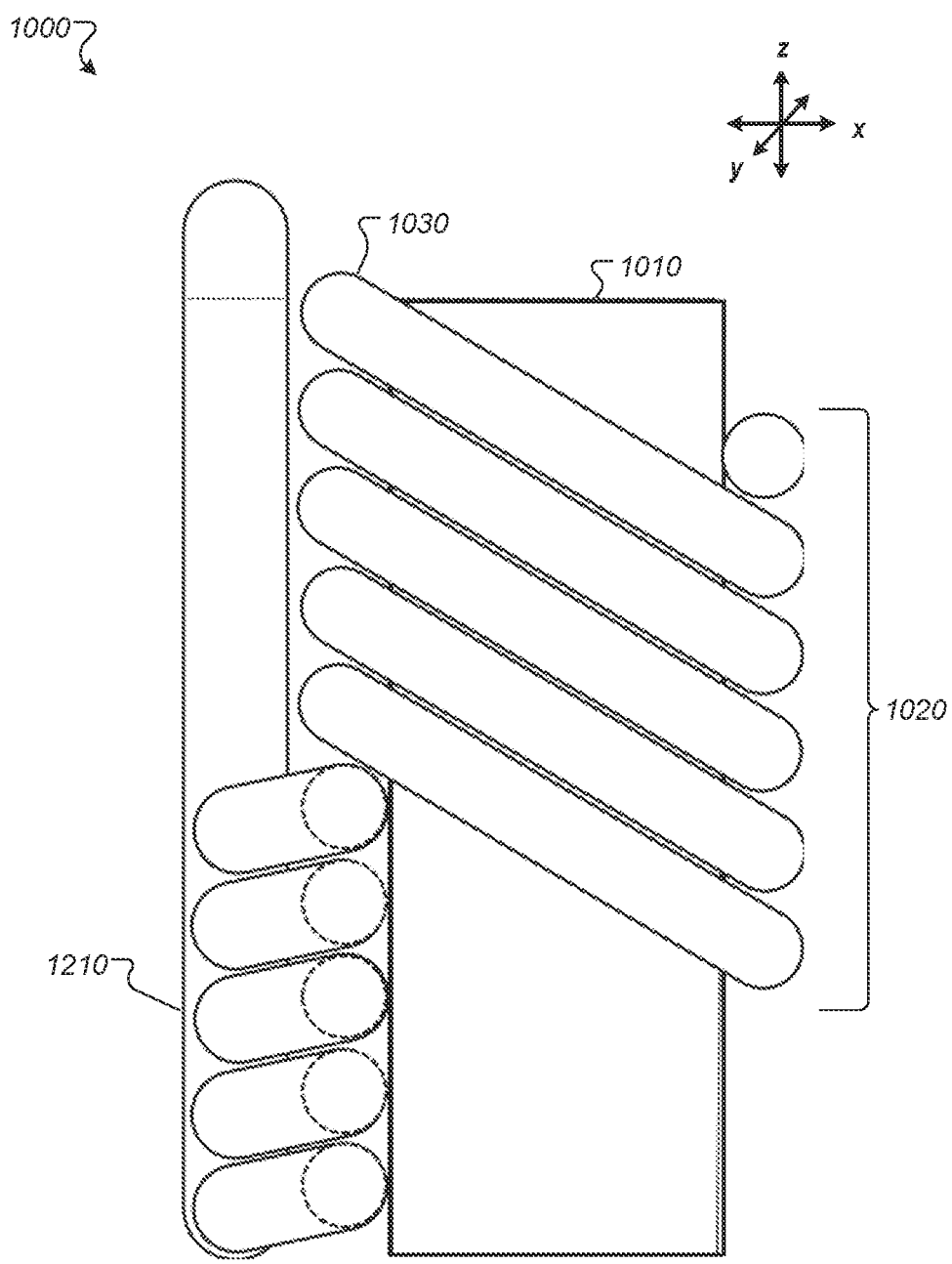
FIG. 31 shows a side perspective view of the heat exchanger and a manifold.

FIG. 31 shows a side perspective view of the heat exchanger 1000 and a manifold 1210. The manifold 1210 connects to one end of each tube 1030. In some implementations, the manifold 1210 can be an inlet manifold providing the second fluid coolant to the tube bundle 1020. In some implementations, the manifold 1210 can be an outlet manifold receiving the second fluid coolant from the tube bundle 1020. The second coolant fluid can change phase while flowing through the tubes 1030. When a phase change occurs, such as boiling water to steam, the manifold 1210 can serve as a vapor separator.

Figure 32:
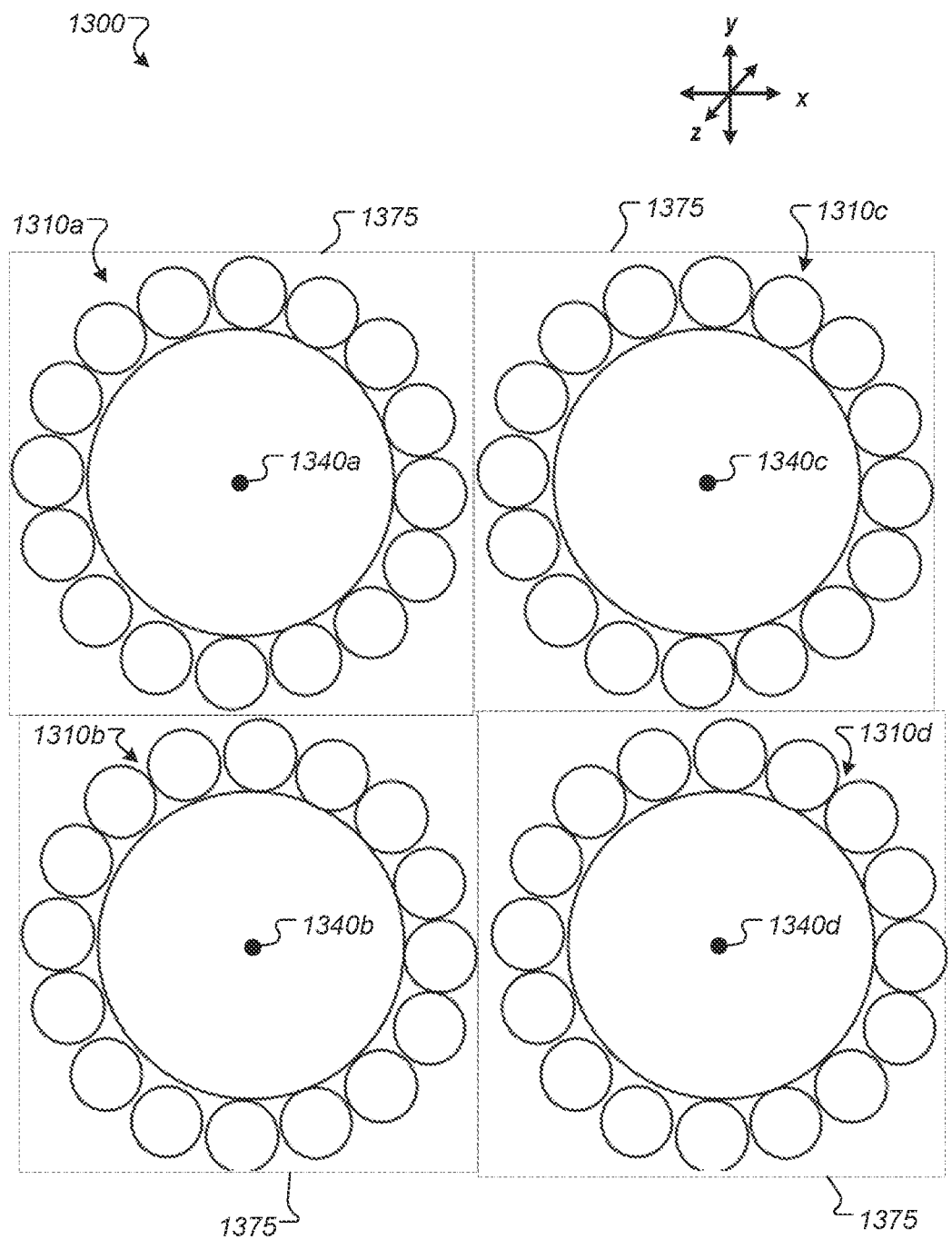
FIG. 32 shows a radial cross-sectional view of a heat exchanger system configured in a rectangular lattice pattern.

FIG. 32 shows an axial cross-sectional view of a heat exchanger system 1300 configured in a square (or, in some aspects, rectangular) lattice pattern. The heat exchanger system 1300 is an array of multiple heat exchangers 1310*a*, 1310*b*, 1310*c*, 1310*d*, positioned in close proximity to one another. The heat exchangers 1310*a*, 1310*b*, 1310*c*, and 1310*d* are each centered on an axis 1340*a*, 1340*b*, 1340*c*, and 1340*d*, respectively. The axes 440 can be parallel to each other. As shown in this figure, the square lattice pattern of the heat exchanger system 1300 can follow from square (or substantially square) fuel elements 1375, shown in dashed line. Each fuel element 1375 can be positioned below the evaporating regions of the respective heat exchanges 1310*a-c*. A bore or annulus (e.g., circular) formed in each fuel element 1375 receives the respective heat pipe about which the respective heat exchanger 1310 is positioned.

The heat exchangers 1310 are arranged in a rectangular lattice such that, from an axial cross-sectional view perspective, the axes 1340 each form a vertex of a rectangular shape. Specifically, the axes 1340 form a square. The heat exchanger system 1300 can include any number of heat exchangers 1310 positioned in the rectangular lattice pattern.

Figure 33:
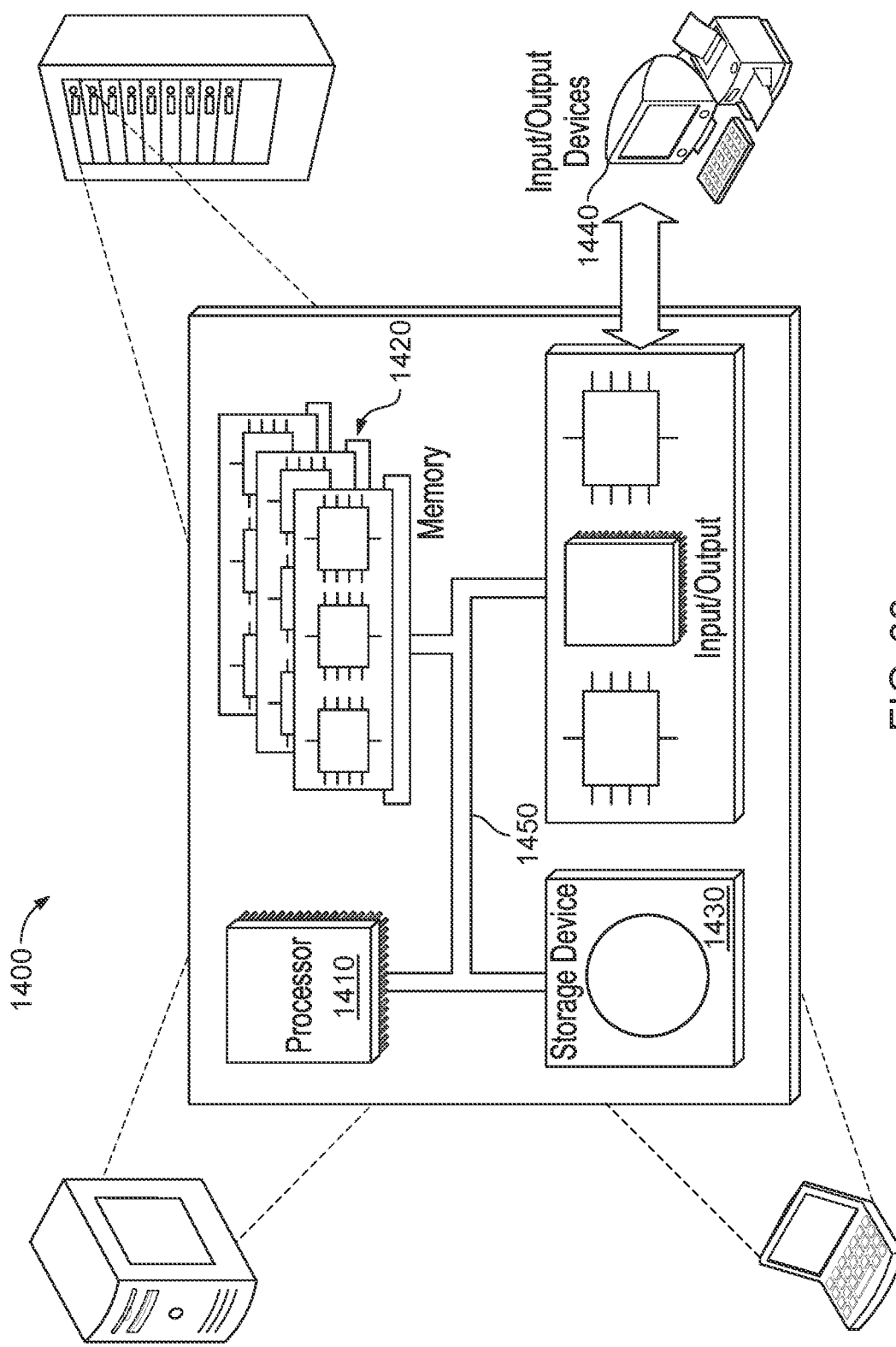
FIG. 33 shows a schematic diagram of a computer system.

FIG. 33 is a schematic diagram of a computer system 1400. The system 1400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 1400)

and their structural equivalents, or in combinations of one or more of them. The system 1400 is intended to include various forms of digital computers, such as laptops, desktops, workstations, personal digital assistants, servers, blade servers, mainframes, and other appropriate computers. The system 1400 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. The processor may be designed using any of a number of architectures. For example, the processor 1410 may be a CISC (Complex Instruction Set Computers) processor, a RISC (Reduced Instruction Set Computer) processor, or a MISC (Minimal Instruction Set Computer) processor.

In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one implementation, the memory 1420 is a computer-readable medium. In one implementation, the memory 1420 is a volatile memory unit. In another implementation, the memory 1420 is a non-volatile memory unit.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, a tape device, or a solid state device.

The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A nuclear fuel cell lifting system, comprising:
    a radiation shield comprising:
        a first plate defining a first plane and comprising one or more first openings; and
        a second plate defining a second plane parallel to the first plane;
            the second plate comprising one or more second openings,
            the first plate and the second plate being rotatable relative to each other around an axis perpendicular to the first plane and the second plane to align a first opening of the first plate with a second opening of the second plate,
            wherein the first opening of the first plate aligned with the second opening of the second plate forms a combined opening;
    a tether that is attachable to a nuclear fuel cell of a nuclear reactor;
    a radiation shielding cask configured to allow the fuel cell to be lifted therein; and
    a lifting motor configured to extend and retract the tether,
        wherein the lifting motor is operable while retracting the tether to cause the tether to lift the nuclear fuel cell
            from a reactor core of the nuclear reactor,
            through the combined opening of the radiation shield,
            and into the radiation shielding cask.

2. The nuclear fuel cell lifting system of claim 1, comprising a hook coupled to an end of the tether, wherein the hook is configured to link to an attachment of the nuclear fuel cell.

3. The nuclear fuel cell lifting system of claim 1, wherein the radiation shield is mapped to a coordinate system corresponding with an overhead arrangement of nuclear fuel cells of the nuclear reactor core,
    the first plate and the second plate being rotatable relative to the nuclear reactor core to align the combined opening with a coordinate position of any nuclear fuel cell of the nuclear reactor core when the radiation shield is atop the nuclear reactor core.

4. The nuclear fuel cell lifting system of claim 1, comprising
    a movement mechanism that enables movement of the nuclear fuel cell lifting system along a track positioned over the nuclear reactor core.

5. The nuclear fuel cell lifting system of claim 1, comprising
    a movement mechanism that enables movement of the nuclear fuel cell lifting system in free motion over the nuclear reactor core.

6. The nuclear fuel cell lifting system of claim 1, wherein a size of each of the one or more second openings is greater than a size of each of the one or more first openings.

7. The nuclear fuel cell lifting system of claim 1, wherein the combined opening is configured to allow passage of the nuclear fuel cell through the combined opening.

8. The nuclear fuel cell lifting system of claim 1, wherein the one or more second openings comprises an opening extending from a center of the second plate to an edge of the second plate in the second plane.

9. The nuclear fuel cell lifting system of claim 2, wherein the hook is configured to link to the attachment of the nuclear fuel cell on one or more of a top or a side of the nuclear fuel cell.

10. The nuclear fuel cell lifting system of claim 2, wherein the hook is configured to attach to one or more of a hook, tab, pin, friction scissor grab, magnet, or groove of the nuclear fuel cell.

11. The nuclear fuel cell lifting system of claim 1, wherein a size of each of the one or more second openings is greater than a size of each of the one or more first openings, and
    the combined opening is configured to allow passage of the nuclear fuel cell through the combined opening.

12. The nuclear fuel cell lifting system of claim 1, wherein a size of each of the one or more second openings is greater than a size of each of the one or more first openings, and the one or more second openings comprise an opening extending from a center of the second plate to an edge of the second plate in the second plane.

13. The nuclear fuel cell lifting system of claim 3, comprising
    a movement mechanism that enables movement of the nuclear fuel cell lifting system along a track positioned over the nuclear reactor core.

14. The nuclear fuel cell lifting system of claim 3, comprising
    a movement mechanism that enables movement of the nuclear fuel cell lifting system in free motion over the nuclear reactor core.

15. The nuclear fuel cell lifting system of claim 1, wherein the at least one of the first plate or the second plate is rotatable by a motor system.

* * * * *